(12) United States Patent
Omori

(10) Patent No.: US 6,667,945 B2
(45) Date of Patent: Dec. 23, 2003

(54) DISK DRIVE DEVICE

(75) Inventor: Kiyoshi Omori, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/838,689

(22) Filed: Apr. 19, 2001

(65) Prior Publication Data

US 2003/0081534 A1 May 1, 2003

(30) Foreign Application Priority Data

Apr. 21, 2000 (JP) ........................................ 2000-126319

(51) Int. Cl.[7] .............................................. G11B 23/00
(52) U.S. Cl. ..................... 369/263; 369/219; 369/244
(58) Field of Search ............................... 369/219, 244, 369/215, 77.1, 77.2, 249, 263

(56) References Cited

U.S. PATENT DOCUMENTS

| | | | | |
|---|---|---|---|---|
| 5,970,035 A | * | 10/1999 | Ohmori et al. | ............ 369/53.2 |
| 5,982,735 A | * | 11/1999 | Tsai | ............ 369/219 |
| 6,356,525 B1 | * | 3/2002 | Ikedo et al. | ................ 369/219 |
| 6,385,160 B1 | * | 5/2002 | Jeon | ............ 369/219 |
| 6,483,798 B1 | * | 11/2002 | Wu | ............ 369/219 |

FOREIGN PATENT DOCUMENTS

| | | |
|---|---|---|
| JP | 07230655 | 8/1995 |
| JP | 11045487 | 2/1999 |
| JP | 11066767 | 3/1999 |

OTHER PUBLICATIONS

Southcott C B et al.: "Voice control of the pan–European digital mobile radio system" IEEE 1989 Conference Article, XP010083625 Main Chapter "The Comfort Noixe sub- –system" from p. 1071, right column to p. 1072, left column.

* cited by examiner

Primary Examiner—A. J. Heinz
Assistant Examiner—Mark S Blouin
(74) Attorney, Agent, or Firm—Jay H. Maioli

(57) ABSTRACT

A disk drive device in which at least two positioning pins are implanted into a motor base which is a bottom end of a spindle motor, and, while these positioning pins are pushed against a side surface of a guide main shaft for guiding a sled (a pickup moving mechanism) to which an objective lens is mounted, the motor base is screwed to the bottom portion or an ascending-and-descending frame through a spacer.

17 Claims, 35 Drawing Sheets

BIG. 22C

DISK DRIVE DEVICE

BACKGROUND OF THE INVENTION

1. Field of the Invention

The present invention relates to the technical field of a disk drive device which is suitable for use as an optical disk device for performing a recording operation and/or a reproducing operation on an optical disk, such as a compact disk (CD) and a digital versatile disk (DVD).

2. Description of the Related Art

The applicant of the present invention previously filed an application for a tray-system optical disk device 1, such as that shown in FIGS. 35 to 42, as an optical disk device which is one example of a disk drive device.

As shown in FIG. 35, an optical disk 1, such as a CD or a DVD, which is a disk-shaped recording medium, is placed horizontally inside a recess 3 formed in the top surface of a tray body 2a of a disk tray 2. Then, when a tray front panel 2b of the disk tray 2 is lightly pushed in the direction of direction a, a loading switch (not shown) is turned on. A loading mechanism unit 27 (described later) causes the disk tray 2 to be horizontally drawn into a disk device body 6 of an optical disk device 5 from a tray entering-and-exiting opening 4 in a front panel 6a in the direction of arrow a which is the loading direction, as shown in FIG. 36. As described below, this causes the optical disk 1 to be automatically loaded horizontally onto a disk table of a spindle motor.

In the structure, after the loading, for example, a recording command signal and/or a reproducing command signal from a host computer causes the optical disk 1 to be rotationally driven at a high speed by the spindle motor in order for an optical pickup, which is a data pickup means, to record and/or reproduce data onto/from the optical disk 1. Then, after the recording operation and/or the reproducing operation on the optical disk 1, when an eject button 7 on the front panel 6a is pushed, the loading mechanism unit 27 (described later) causes the disk tray 2 to be automatically unloaded out of the disk device body 6 from the tray entering-and-exiting opening 4 in the direction of arrow b which is the unloading direction, as shown in FIG. 35.

As shown in FIGS. 35 to 42, the horizontal tray body 2a of the disk tray 2 and the vertical tray front panel 2b, which is at right angles to the directions of arrows a and b, are formed of, for example, synthetic resin. From the center of the recess 3 of the tray body 2a to the back end (that is, the end towards which the arrow a points), a slot-shaped bottom surface opening 8 is formed along a tray centerline P1 which is horizontal to the directions of arrows a and b which are the loading and unloading directions, respectively. The disk tray 2 is constructed so as to be actuated by a tray moving mechanism (not shown) of a loading mechanism in such a manner as to horizontally move into and out of the disk device body 6 in the directions of arrows a and b. Four disk holding sections 3a are mounted to four corresponding locations of the outer periphery of the recess 3 of the disk tray 2 so as to be rotationally adjustable. The disk-holding sections 3a are constructed so that, when the optical disk device 5 is used in a vertical posture, they can hold the optical disk 1 inserted vertically into the recess 3.

In the structure, a shallow, almost box-shaped chassis 14, which is formed of, for example, synthetic resin, is provided inside the disk device body 6. An ascending-and-descending frame 16, which is formed of, for example, synthetic resin or sheet metal, is mounted inside a large, substantially rectangular opening 14b formed in a bottom portion 14a of the chassis 14. A total of four substantially gourd-shaped insulators 19 and insulators 20 are mounted to the ascending-and-descending frame 16, the two insulators 19 being mounted at the left and right sides of a back end portion 16a, and the two insulators 20 being mounted at the left and right sides of a front end portion 16b. The insulators 19 and the insulators 20 are shock absorbers formed of resilient material such as rubber. The pair of left and right insulators 19 mounted to the back end portion 16a of the ascending-and-descending frame 16 are mounted to the upper portion of the back end side of the bottom portion 14a of the chassis 14 by setscrews 21 which are inserted into the centers thereof. The left and right insulators 20 mounted to the front end portion 16b of the ascending-and-descending frame 16 are mounted to the lower portion of the left and right sides of an ascending-and-descending actuation frame 23 by setscrews 22 which are inserted into the centers thereof. By the ascending-and-descending actuation frame 23, the front end portion 16b of the ascending-and-descending frame 16 is actuated so as to move upward and downward in the directions of arrows c and d through the pair of left and right insulators 20 by an upward rotational motion and a downward rotational motion on the pair of left and right insulators 19 at the back end portion 16a serving as rotational fulcra.

The loading mechanism unit 27 is mounted to the upper portion of the front end side of the bottom portion 14a of the chassis 14. The loading mechanism unit 27 comprises a cam lever 34 which is rotationally driven by a loading motor 28 through a belt transmission mechanism 29 and a gear transmission mechanism 30. The ascending-and-descending actuation frame 23 is mounted at the front-end-side left and right sides of the opening 14b of the chassis 14 by a pair of left and right support pins 24, one being provided at the left side and the other at the right side of the back end of the ascending-and-descending actuation frame 23. The ascending-and-descending actuation frame 23 is mounted so as to be rotatable upward and downward. A pair of left and right ascending-and-descending guide pins 25 are mounted closer to the front side than the pair of left and right pair of support pins 24, one at the left side and one at the right side of the ascending-and-descending actuation frame 23. A cam driven pin 36 which is mounted to substantially the center portion of the front end of the ascending-and-descending actuation frame 23 is inserted inside a cam groove 35 of the cam lever 34.

When loading, the loading motor causes the disk tray 2 to be horizontally drawn in the direction of arrow a to a loading position (shown in FIG. 35) inside the optical disk device 5 from an unloading position (shown in FIGS. 36 and 38) outside the optical disk device 5. Thereafter, as shown in FIG. 39, by the cam groove 35 of the cam lever 34 which is rotationally driven in the direction of arrow c', the cam driven pin 36 at an end of the ascending-and-descending actuation frame 23 is actuated upward in the direction of arrow c that is the upward direction. Through the insulators 20, the ascending-and-descending actuation frame 23 causes the ascending-and-descending frame 16 to be actuated upward in the direction of arrow c to an ascended position where the ascending-and-descending frame 16 is horizontally positioned (shown in FIG. 38) from a descended position where the ascending-and-descending frame 16 is tilted obliquely downward (shown in FIG. 37), with the pair of left and right insulators 19 serving as centers.

In the structure, when the disk tray 2 is unloaded, the component parts move in a direction opposite to that when the disk tray 2 is loaded. By the cam groove 35 of the cam lever 34 which is rotationally driven in the direction of arrow d' (see FIG. 39), the cam driven pin 36 is driven downward in the direction of arrow d which is the downward direction. Through the left and right insulators 20, the ascending-and-descending actuation frame 23 causes the ascending-and-descending frame 16 to be actuated downward in the direction of arrow d from the ascended position (shown in FIG. 38) to the descended position (shown in FIG. 37), with the pair of left and right insulators 19 as centers. Thereafter, the disk tray 2 is pushed out in the direction of arrow b from the loading position (shown in FIGS. 36 and 38) inside the optical disk device 5 to the unloading position (shown in FIGS. 35 and 37) outside the optical disk device 5. The disk tray 2 is constructed in such a way as to be loaded and unloaded by actuation in the directions of arrows a and b through a rack (not shown) by rotationally actuating a pinion 31 disposed inside the gear transmission mechanism 30 at the loading mechanism unit 27 in the forward and reverse directions.

The ascending-and-descending frame 16 which is the unit base of an optical pickup unit 38 which serves as a data pickup unit is formed with a substantially rectangular frame-like shape. A spindle motor 39 is vertically installed on the top portion of the front end portion 16b of the ascending-and-descending frame 16. A disk table 40, which is formed of a magnetic material, such as metal, is affixed horizontally to the upper end of a motor shaft 39a. A centering guide 40a to which a center hole 1a of the optical disk 1 is fitted is integrally formed at the center of the top portion of the disk table 40. An optical pickup 41, which serves as a data pickup, is horizontally installed behind the spindle motor 39, inside the substantially rectangular opening 16c which is formed at the inner side of the ascending-and-descending frame 16. The optical pickup 41 has a sled 43 on which an objective lens 42 is installed. An optical block, which transmits and receives laser beams to and from the objective lens 42, is integrally mounted to a side surface of the sled 43. An objective lens actuator section 44 which curves outward into a convex shape towards the optical disk 1 is installed on the sled 43. The objective lens 42 is incorporated at the top portion of the objective lens actuator section 44 by a biaxial actuator.

A sled moving mechanism 47 is mounted to the top portion of a side of the back end portion 16a of the ascending-and-descending frame 16 in order to move the sled 43 to which the optical pickup unit 38 is installed in a straight line in the directions of arrows a and b along a pair of left and right guide shafts 45 and 46, which serve as a guide main shaft 45 and a guide sub-shaft 46, respectively. The sled moving mechanism 47 comprises a pinion 50, which is rotationally driven in the forward and reverse directions by a sled drive motor 48 through a gear train 49, and a rack 51 which is mounted to one side surface of the sled 43 and actuated in a straight line by the pinion 50. The spindle motor 39 and the objective lens 42 are disposed on the tray centerline P1. The objective lens 42 is constructed so as to move in the directions of arrows a and b along the tray centerline P1. A skew adjusting mechanism 57 for adjusting the angle between the guide main shaft 45 and the guide sub-shaft 46 in the vertical direction is installed at the lower portion of the ascending-and-descending frame 16.

A clamper supporting frame 52, which is molded out of, for example, a sheet metal, is provided so as to be horizontally constructed between the top ends of the left and right side plates of the chassis 14 in such a manner as to cross the top portion of the disk tray 2. At a location directly above the disk table 40, a disk damper 53, which is molded out of synthetic resin that is a nonmagnetic material, is supported inside a circular hole 54 formed in the center of the clamper supporting frame 52 so as to be movable upward and downward, towards the left and right, and forward and backward within a certain range. A clamper receiver 52a, which catches a flange 53a which is integrally molded at the outer periphery of the top end of the disk damper 53 from therebelow, is integrally formed at the outer periphery of the circular hole 54 of the clamper supporting frame 52. A disk-shaped magnet 55 is horizontally embedded in the center top portion of the disk damper 53. A top cover 6b, which is molded out of a sheet metal that is a magnetic material and which is disposed so as to extend over the top portion of the damper supporting frame 52, is mounted to the top portion of the chassis 14.

Therefore, as shown in FIG. 38, when, by the disk tray 2, the optical disk 1 has been horizontally loaded inside the disk device body 6 in the direction of arrow a, the ascending-and-descending frame 16 is brought to a horizontal posture as a result of moving upward to the ascended position in the direction of arrow c, the disk table 40 is inserted upward from the bottom surface opening 8 of the disk tray 2, so that the centering guide 40a of the disk table 40 is fitted to the center hole 1a of the optical disk 1 from therebelow. The disk table 40 causes the optical disk 1 to fly upward inside the recess 3 of the disk tray 2, and the disk clamper 53 to fly slightly upward from the flange receiver 52a of the clamper supporting frame 52. At this time, the disk damper 53 is attracted to the disk table 40 which is disposed near the bottom surface of the disk clamper 53 by the magnetic force of attraction of the magnet 55. The optical disk 1 is horizontally chucked to the disk table 40 by the disk clamper 53.

As shown in FIGS. 38 to 42, for example, a recording command signal or a reproduction command signal from a host computer causes the spindle motor 39 to rotationally drive the optical disk 1 at a high speed of, for example, at least 3600 rpm, and the sled moving mechanism 47 to move the sled 43 at the optical pickup 41 in the directions of arrows a and b, thereby causing the objective lens 42 to perform a seeking operation in the directions of arrows a and b along the tray center line P1. Then, the spot of the laser beam which is sent from the optical block irradiates and is focused onto the bottom surface of the optical disk 1 by the objective lens 42. The reflected light is received by the optical block through the objective lens 42 in order to record data onto and/or reproduce data from the optical disk 1.

In the structure, by causing the pinion 50 which is driven in the forward and reverse directions through the gear train 49 by the sled drive motor 48 to actuate the rack 51 in a straight line, the sled moving mechanism 47 causes the sled 43 to move in the directions of arrows a and b along the pair of left and right guide shafts 45 and 46. When, after the recording of data onto and/or the reproduction of data from the optical disk 1, the eject button 7 is pushed, the ascending-and-descending frame 16 moves downward to the descended position in the direction of arrow d, thereby causing the disk table 40 to be unchucked from the disk damper 53, and to separate downward from the optical disk 1, as shown in FIG. 37. As shown in FIG. 37, the optical disk 1 is horizontally placed inside the recess 3 of the disk tray 2, and, as shown in FIG. 35, horizontally unloaded outside of the disk device body 6 in the direction of arrow b.

The increasing of the recording capacity to a large recording capacity (that is, the achievement of high-density recording) of this type of optical disk device is being accelerated, so that people are thinking of various methods to achieve this, such as the method of increasing the precision of each of the component parts, the method of performing highly precise adjustments at the manufacturing stage, and the method of using a structure which is adjustable in real time as a result of utilizing an initial signal of the optical disk 1.

One of the simplest methods to achieve a high recording capacity is the method of making adjustments so that the center of the objective lens 42 coincides with the center of the optical disk 1 by causing the interval between the center of the objective lens 42 of the optical pickup 41 and the center of the guide main shaft 45 used to guide the sled 43, and the interval between the center of the spindle motor 39 and the center of the guide main shaft 45 to match.

However, as shown in FIG. 7, conventionally, while a horizontal motor base 39b disposed at the bottom end of the spindle motor 39 is fitted to and positioned from thereabove at a reference hole 62 and a positioning pin 61 implanted in the ascending-and-descending frame 16, the motor base 39b is screwed to the ascending-and-descending frame 16 with a plurality of setscrews 63 from therebelow, and, using a plate spring, the guide main shaft 45 is pushed at right angles to and positioned at a positioning reference portion 64 which is formed by bending portions of the ascending-and-descending frame 16.

However, this method is a method in which the spindle motor 39 and the guide main shaft 45 are positioned with respect to the ascending-and-descending frame 16. It is not a method for directly adjusting the interval between the center of the objective lens 42 and the center of the guide main shaft 45, and the interval between the center of the spindle motor 39 and the center of the guide main shaft 45. Therefore, due to the shifts between the locations of the positioning pin 61 and the reference hole 62 of the ascending-and-descending frame 16, and the location of the positioning reference section 64, the crossing of the diameter of the guide main shaft 45, and the like, variations occur in the interval between the center of the objective lens 42 and the center of the guide main shaft 45, and the interval between the center of the spindle motor 39 and the guide main shaft 45. When the variations occur, high-density recording and/or reproducing operations cannot be performed on the optical disk 1. In order to decrease such variations, it is necessary to increase the precision with which each of the component parts is formed, thereby resulting in considerably increased costs.

SUMMARY OF THE INVENTION

Accordingly, in order to overcome the above-described problems, it is an object of the present invention to provide a disk drive device which is constructed so that the location of the center of a pickup, such as an objective lens, and the location of the center of a disk correspond with high precision in order to increase the capacity of the disk drive device to a high capacity.

To this end, according to the present invention, there is provided a disk drive device which is constructed so that a pickup device for recording data onto and/or reproducing data from a disk-shaped recording medium is guided by a guide main shaft and a guide sub-shaft, to which a pickup mounting frame is mounted, and is moved in a radial direction of the disk. The disk drive device comprises positioning means used for a mounting operation with reference to the guide main shaft as a positioning reference during the mounting of a spindle motor to the pickup mounting frame.

In the disk drive device having the above-described structure, the guide main shaft used for guiding the pickup device for the disk-shaped recording medium is mounted to the pickup mounting frame first. Then, the spindle motor is positioned with respect to the guide main shaft by the positioning means, and is mounted to the pickup mounting frame in order to position the pickup means and the spindle motor with respect to each other with high precision, with the guide main shaft serving as a reference.

BRIEF DESCRIPTION OF THE DRAWINGS

FIGS. 22A to 22C illustrate the plastic deformation of a plate spring of a conventional skew adjusting mechanism.

DESCRIPTION OF THE PREFERRED EMBODIMENT

Hereunder, a description of an embodiment of a disk drive device in accordance with the present invention used as an optical disk device will be given. The contents of the description are as follows, and will be discussed in the following order.

(1) Description of the order of assembly of the optical disk device (FIGS. 23 to 34)

(2) Description of the precision of the assembly of an optical pickup unit (FIGS. 1 to 6)

(3) Description of a first form of a skew adjusting mechanism (FIGS. 3 to 13)

Figure 14:
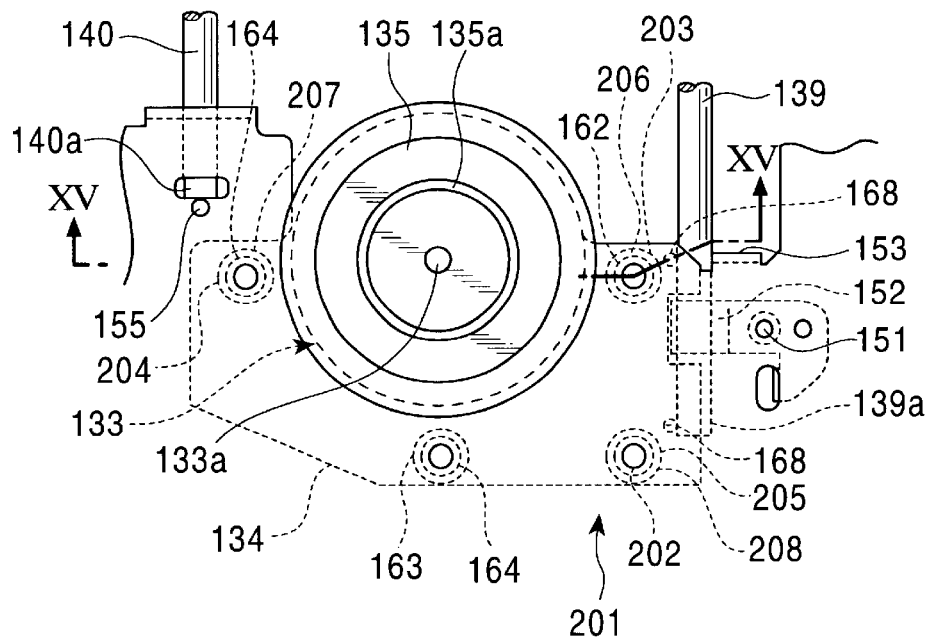
FIG. 14 is a plan view of a second form of the skew adjusting mechanism of the optical disk device in accordance with the present invention.
Figure 15:
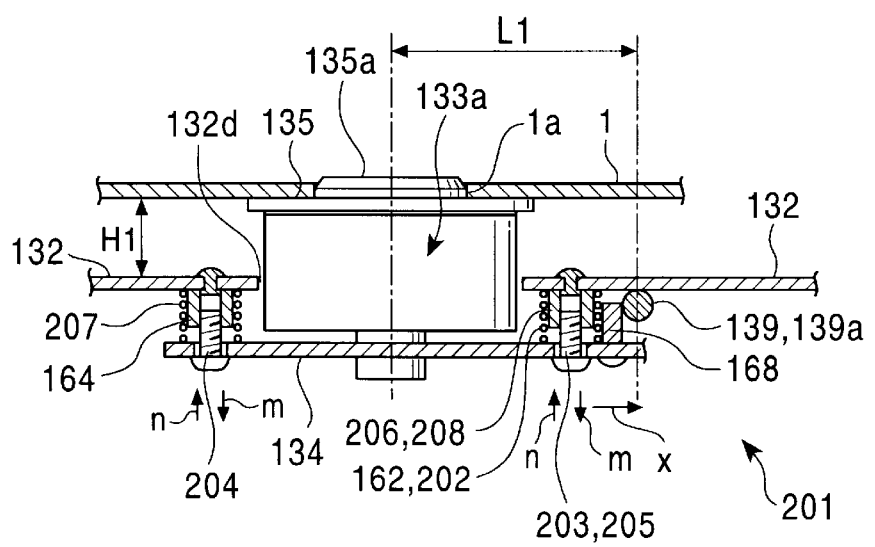
FIG. 15 is a sectional view taken along double-headed arrow XV—XV of FIG. 14.

(4) Description of a second form of a skew adjusting mechanism (FIGS. 14 and 15)

(5) Description of a plate spring mechanism (FIGS. 16 to 21)

(1) Order of Assembly of the Optical Disk Device

Figure 23:
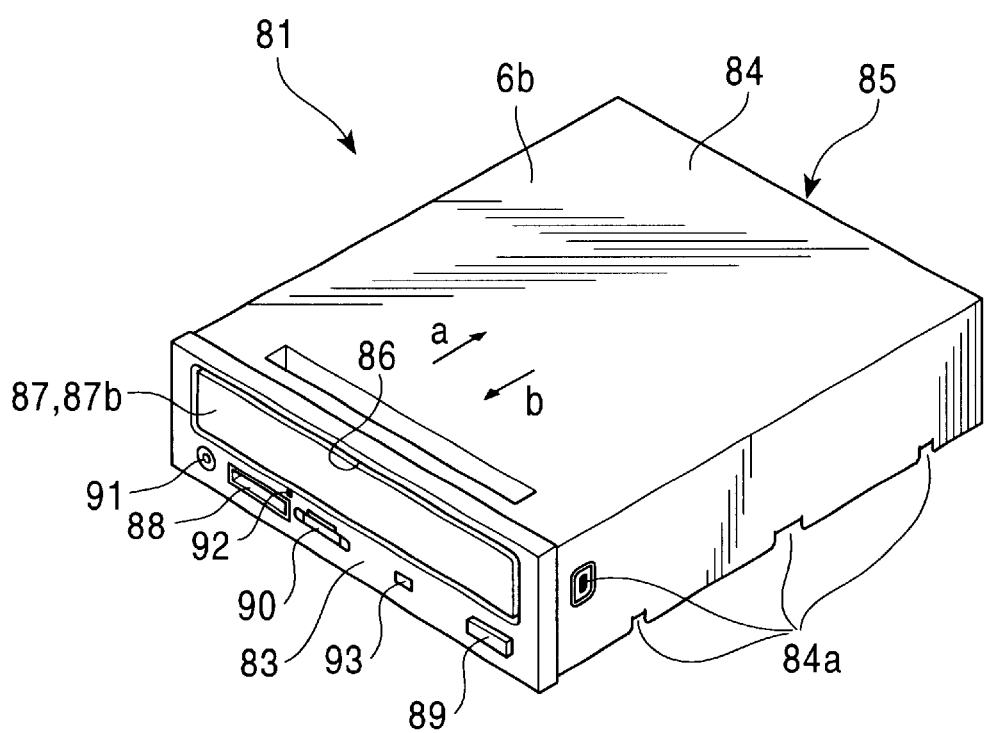
FIG. 23 is a perspective view of the optical disk device of the present invention.
Figure 24:
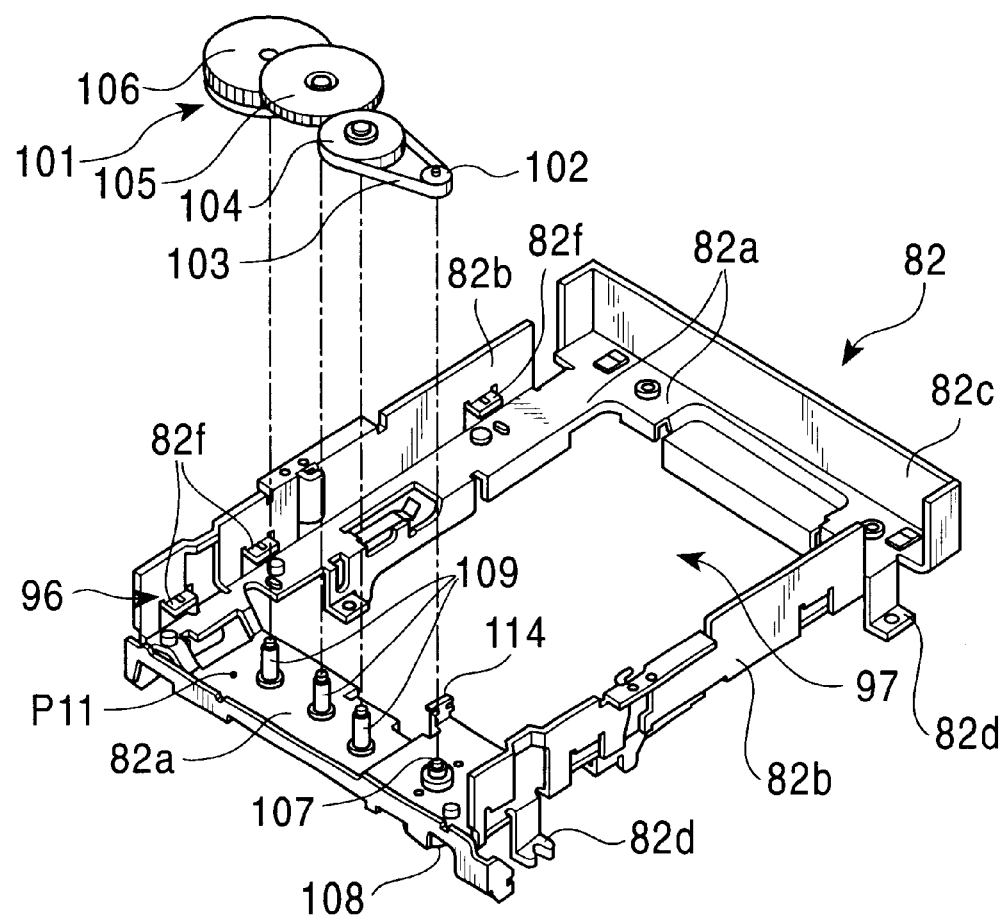
FIG. 24 is an exploded perspective view used to illustrate the assembly of a loading gear unit of the optical disk device.
Figure 34:
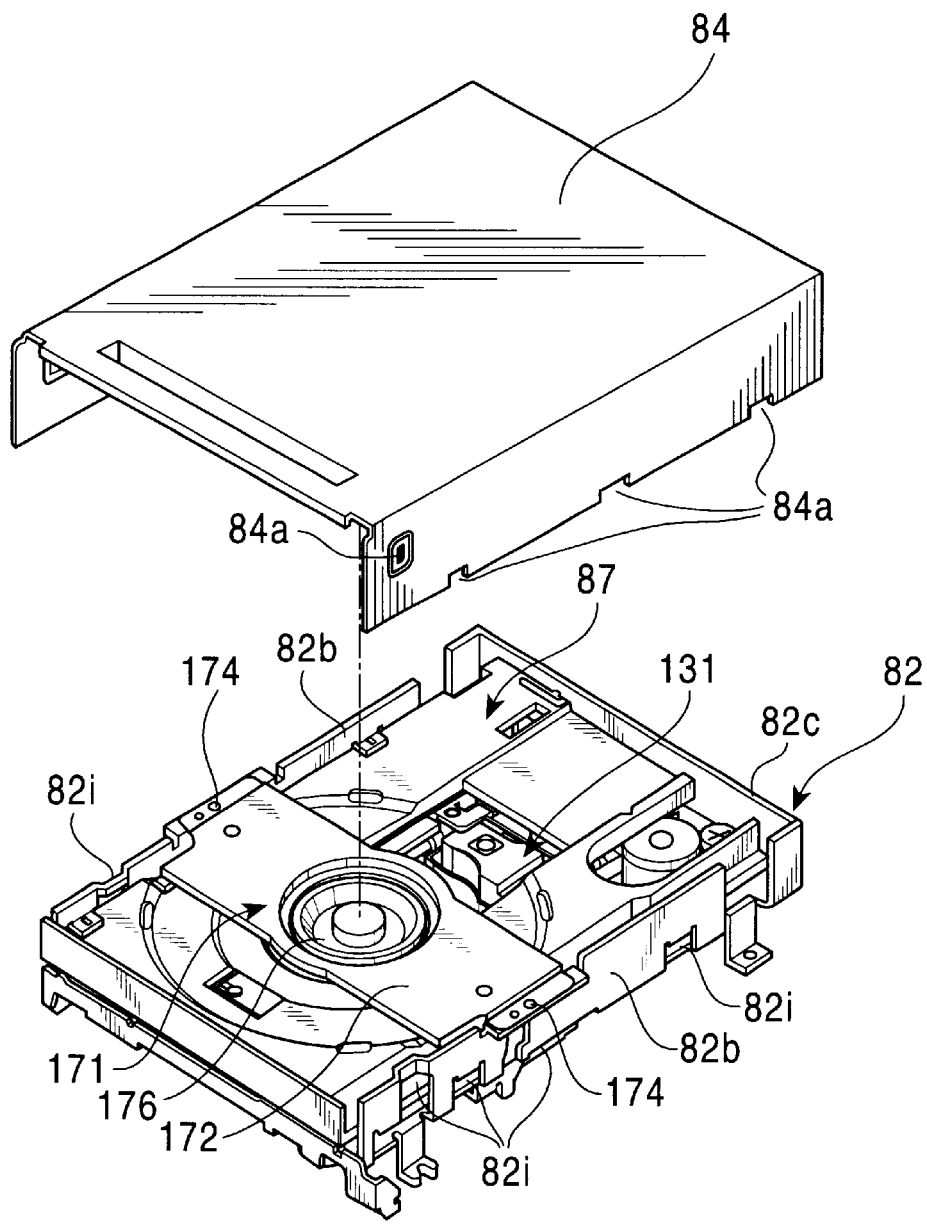
FIG. 34 is an exploded perspective view used to illustrate the assembly of the top cover of the optical disk device.
Figure 35:
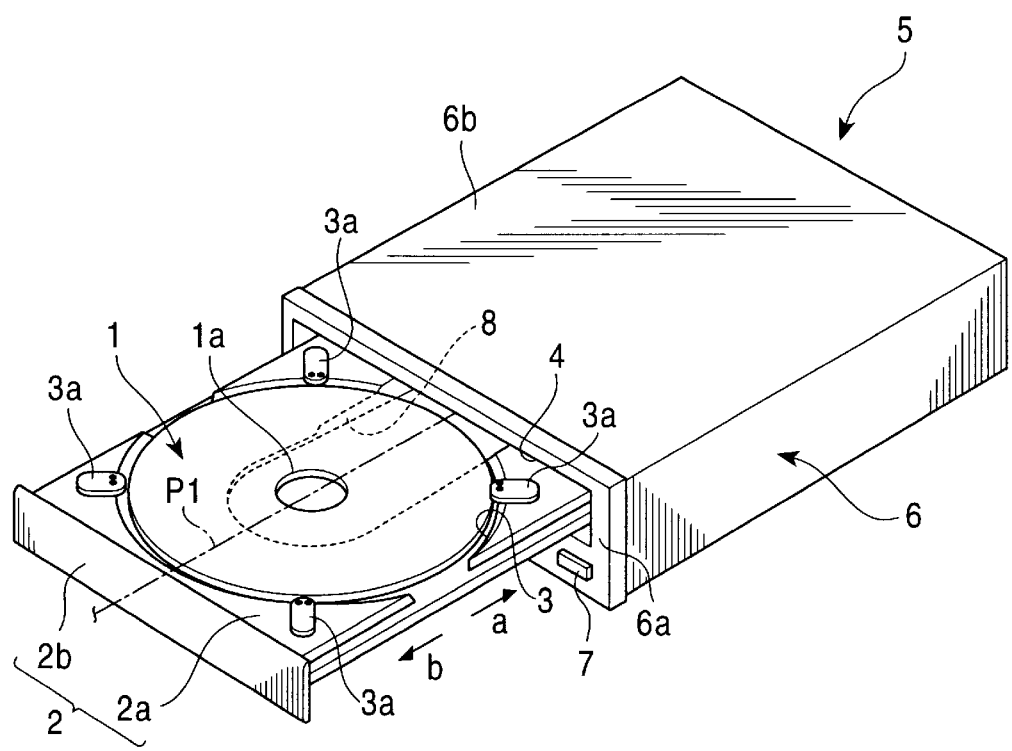
FIG. 35 is a perspective view showing a state in which the conventional optical disk device is unloaded.
Figure 36:
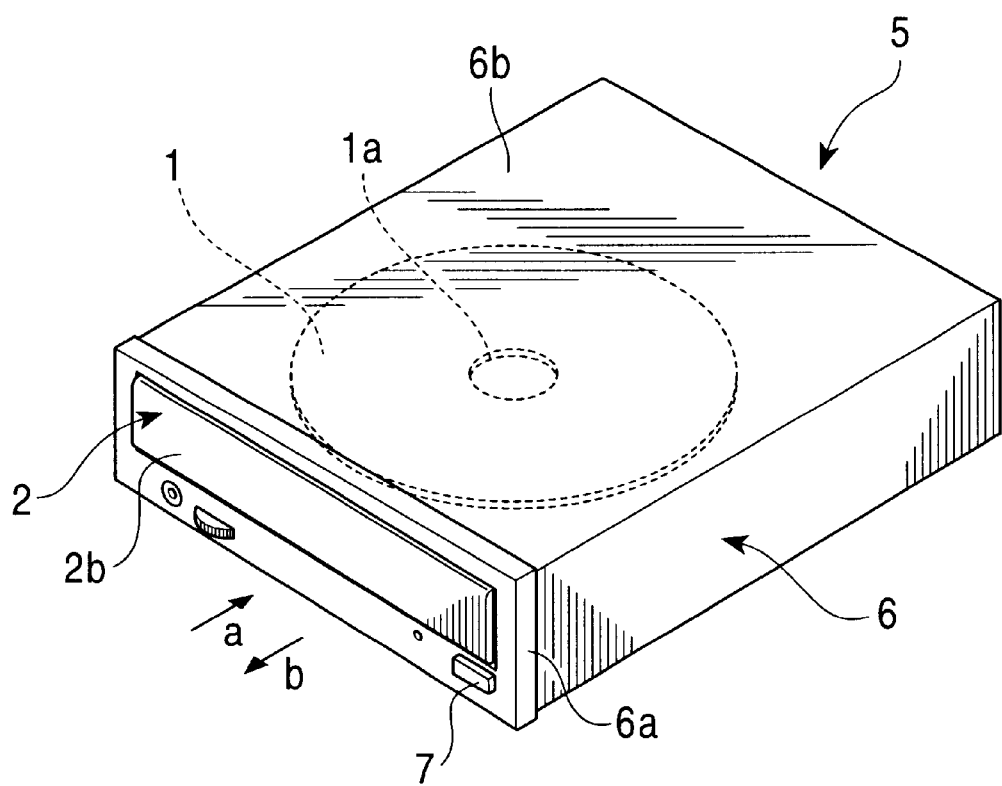
FIG. 36 is a perspective view showing a state in which the optical disk device is loaded.

A description of the order in which an optical disk device that is a disk drive device is assembled is given with reference to FIGS. 23 and 34. As shown in FIGS. 23, 24, and 34, in an optical disk device 81 of the present invention, a flat, box-type disk device body 85 is formed by a chassis 82, a front panel 83, and a top cover 84. A disk tray 87, which horizontally moves into and out of a tray entering-and-exiting opening 86 that is an opening which is long sideways and formed in the upper portion side of the front panel 83 in the directions of arrows a and b, is used to load and unload an optical disk 1, which is a disk-shaped recording medium, into and out of the optical disk device 81. As is conventionally the case, there are disposed at the lower portion side of the front panel 83 an opening 88 for inserting a card-type recording medium which has a flash memory, such as a memory stick (which is a trade name used by Sony Corporation) built therein, an eject button 89, a tone control 90, a headphone jack 91, an emergency eject pin inserting hole, an operating state display LED (light-emitting diode) 93, etc.

As shown in FIG. 24, the chassis 82 is formed by pressing a sheet metal, such as a sheet iron, and comprises a horizontal wall 82a, a pair of left and right vertical side walls 82b, and a vertical back wall 82c. The vertical walls 82b, 82b, and 82c are bent vertically upward from the left and right sides and the back end of the horizontal wall 82a, respectively. The front end of the horizontal wall 82a is open due to an open section 96. A large, rectangular opening 97 is formed in substantially the center portion of the horizontal wall 82a. A plurality of standing portions which extend downward from the outer periphery of the horizontal wall 82a are also provided.

Units and parts which are incorporated inside the chassis 82 include a loading gear unit 101, a slide frame 111, an ascending-and-descending actuation frame 121, an optical pickup unit 131, which serves as a pickup unit, and a disk clamper unit 171. Like the chassis 82, the slide frame 111, the ascending-and-descending actuation frame 121, an ascending-and-descending frame 132, a disk clamper supporting frame 172 of the disk clamper unit 171, etc. are formed by pressing a sheet metal, such as a sheet iron. The ascending-and-descending frame 132 is a unit frame as well as a pickup mounting frame of the optical pickup unit 131. These sheet metal component parts are formed of iron, so that, when they are no longer needed, they can be buried into the earth. When such component parts are buried into the earth, they change back to earth after a few years, thereby making it possible to handle such parts as parts which are friendly to nature.

Figure 25:
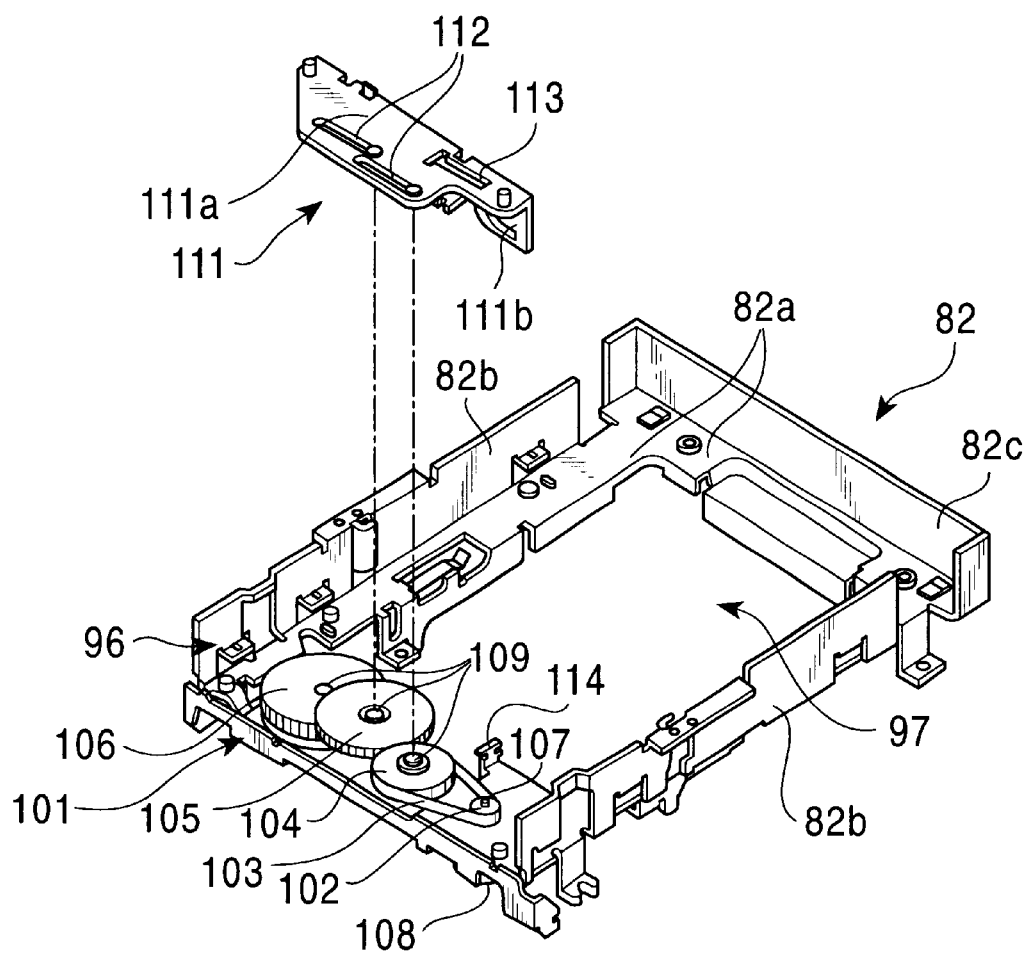
FIG. 25 is an exploded perspective view used to illustrate the assembly of a slide frame of the optical disk device.

The order of assembly of the optical disk device 81 will now be described. As shown in FIGS. 24 and 25, the loading gear unit 101 is fitted to an installation position P11 at the front end side of the opening 97 of the horizontal wall 82a of the chassis 82 from thereabove.

Figure 27:
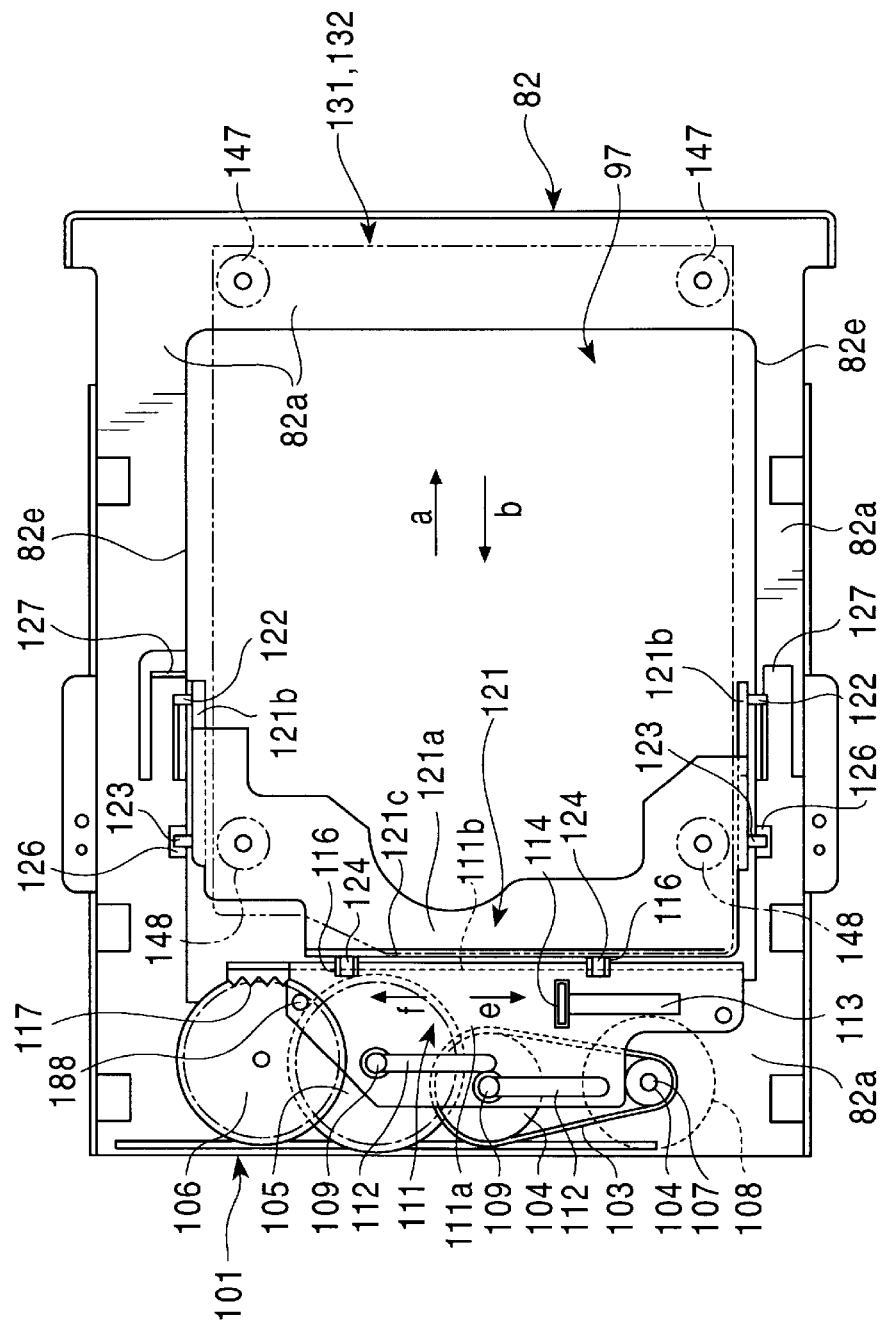
FIG. 27 is a plan view of FIG. 26.

The loading gear unit 101 comprises an input pulley 102, a geared pulley 104 which moves in response to the movement of the input pulley 102 through a rubber belt 103, an intermediate gear 105 which is a reduction gear that moves in response to the movement of the geared pulley 104, and an output gear 106. Four gear parts, the input pulley 102, the geared pulley 104, the intermediate gear 105, and the output gear 106 are fitted so as to be inserted to a motor shaft 107 and three support shafts 109 from thereabove. The motor shaft 107 and the support shafts 109 are mounted vertically at the installation position P11 on the horizontal wall 82a of the chassis 82. As shown in FIG. 27, the motor shaft 107 is the motor shaft of a loading motor 108 which is screwed to the bottom portion of the horizontal wall 82a.

As shown in FIGS. 25 to 30, the slide frame 111 is fitted to the top portion of the loading gear unit 101 from thereabove in order to insert a portion thereof to the front end side inside the opening 97 of the chassis 82.

A side surface of the slide frame 111 has an L shape formed by a horizontal plate portion 111a and a vertical plate portion 111b which is bent vertically downward from the back end of the horizontal plate portion 111a.

Two guide grooves 112 and one dislodging preventing guide groove 113, formed in the horizontal plate portion 111a of the slide frame 111, are fitted to two of the support shafts 109, that is, that of the geared pulley 104 and that of the intermediate gear 105 of the loading gear unit 101, and to the top end of a dislodging preventing support column 114 (which is provided in a standing manner in the vertical direction, upward from the horizontal wall 82a). The vertical plate portion 111b is inserted vertically to the front end side inside the opening 97. The above-described inserting operations cause the slide frame 111 to be supported horizontally at the top ends of two of the support shafts 109 and the dislodging preventing support column 114. The slide frame 111 is assembled so as to be slidable horizontally in the directions of the arrows e and f (see FIG. 27) which are sideways directions perpendicular to the directions of arrows a and b that are loading and unloading directions of the disk tray 87. A rack 117 which is integrally pressed to the front surface of one end side of the vertical plate portion 111b of the slide frame 111 can engage the lower gear of the output gear 106 of the loading gear unit 101.

Next, as shown in FIGS. 26 to 29, by fitting the ascending-and-descending actuation frame 121 to an incorporation position P12 at the front end side of the opening 97, it is mounted to the chassis 82 so that it can rotate in the directions of arrows g and h that are upward and downward directions, and is linked so that it can be actuated in the directions of arrows g and h by the slide frame 111.

The ascending-and-descending actuation frame 121 is formed into a substantially U shape in plan view by a horizontal plate portion 121a, left and right arms 121b, and a front edge 121c. The left and right arms 121b extend parallel to each other and backwards from the left and right sides of the horizontal plate portion 121a. The front edge 121c has a small height and is formed vertically in a standing manner, upward from the front end of the horizontal plate portion 121a. A pair of concentrically formed left and right support pins 122 are formed, one on the left side of the back portion of the left arm 121b and the other on the right side of the back portion of the right arm 121b. Similarly, a pair of concentrically formed 123 are formed, one on the left side of the front portion of the left arm 121b and the other on the right side of the front portion of the right arm 121b. A pair of left and right cam driven pins 124 are horizontally provided on the front surface of the front edge 121c so as to protrude therefrom.

The pair of left and right support pins 122 are fitted into a pair of left and right support pin fitting holes 125, and the pair of left and right support pins 123 are fitted to a pair of left and right arcuate guide grooves 126. The pair of support pin fitting holes 125 are formed in a pair of left and right inside vertical walls 82e which are provided vertically in a standing manner, downward from the pair of left and right sides of the opening 97 of the chassis 82. By the fitting operations, the ascending-and-descending actuation frame 121 is mounted to the chassis 82 so as to be rotatable in the directions of arrows g and h that are upward and downward directions, with the pair of left and right support pins 122 serving as centers.

Thereafter, the pair of left and right cam drive pins 124 are inserted, one into a top end 115a of the left cam groove 115 and the other into a top end 115a of the right cam groove 115, as a result of passing them through cutaway portions 116 used for moving the cam driven pins into and out of them and being cut away upward from the top ends 115a of the left and right substantially Z-shaped cam grooves 115 formed in the vertical plate portion 111b of the slide frame 111.

When these operations are carried out, the sliding movement of the slide frame 111 in the directions of arrows e and f causes the pair of left and right cam driven pins 124 to be driven upward and downward in the directions of arrows g and h in the space extending from the top ends 115a, intermediate inclined portions 115b, and bottom ends 115c of the corresponding left and right cam grooves 115. The slide frame 111 and the ascending-and-descending actuation frame 121 are linked together so that the ascending-and-descending actuation frame 121 is actuated upward and downward in the directions of arrows g and h inside the opening 97, with the pair of left and right support pins 122 as centers.

Figure 26:
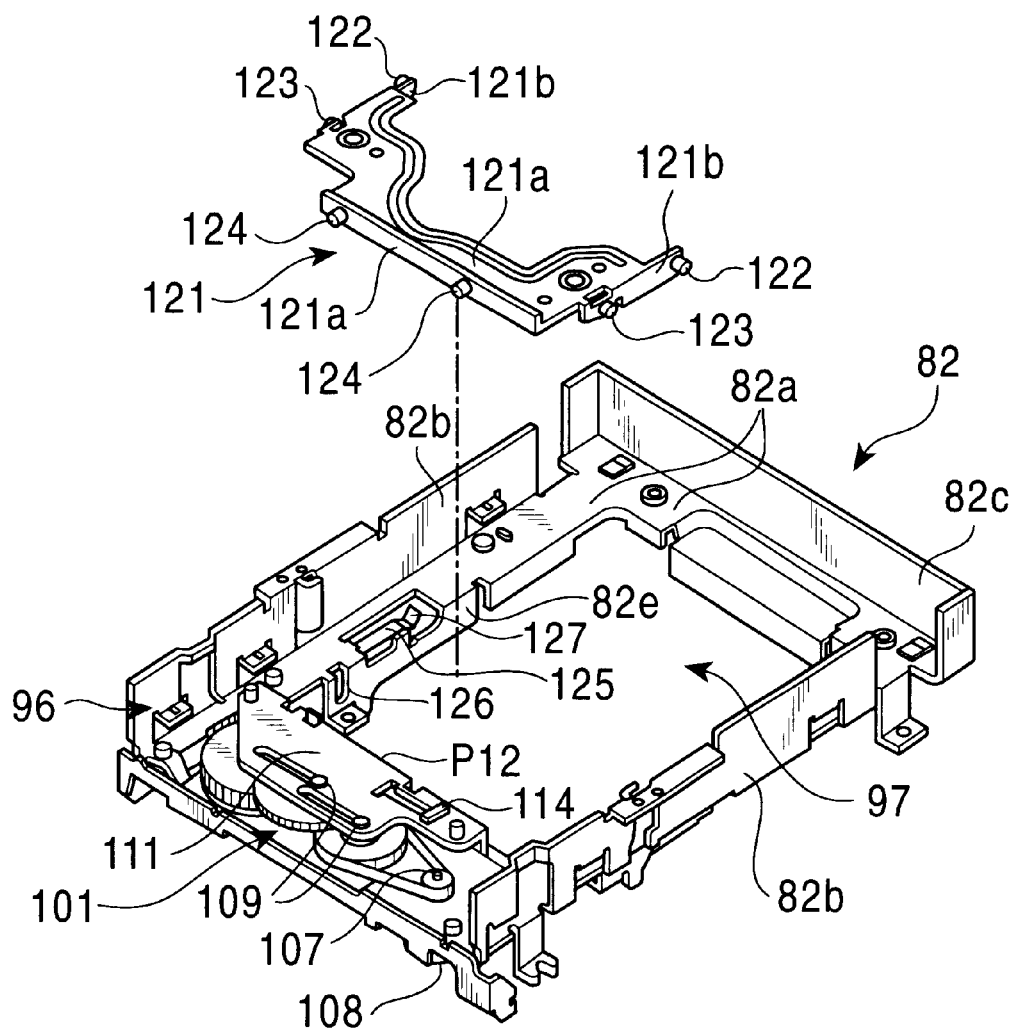
FIG. 26 is an exploded perspective view used to illustrate the assembly of an ascending-and-descending actuation frame of the optical disk device.
Figure 28:
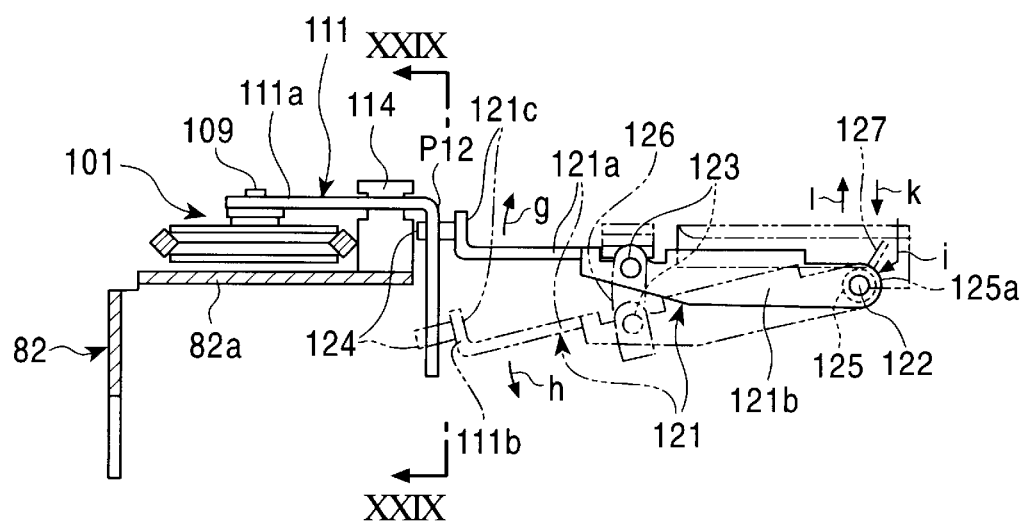
FIG. 28 is a partly cutaway enlarged side view of the main portion shown in FIG. 27.
Figure 29:
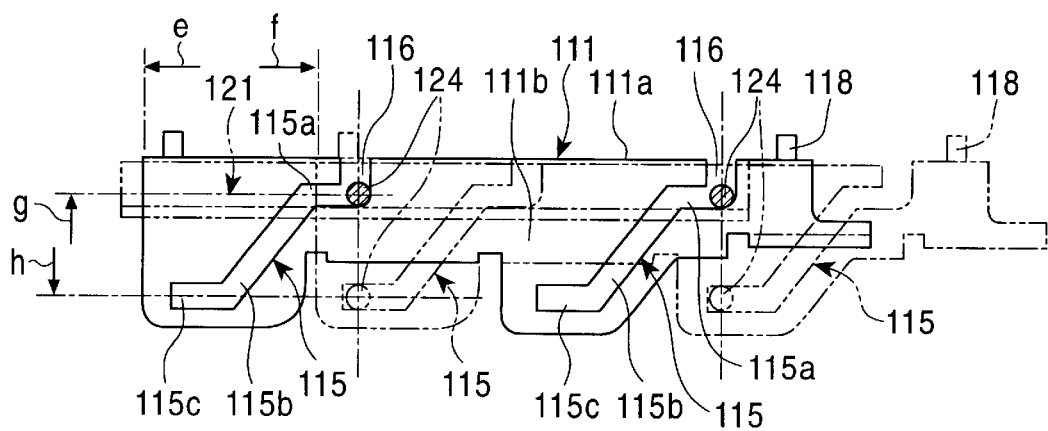
FIG. 29 is a side view taken along double-headed arrow XXIX—XXIX of FIG. 28.

As shown in FIGS. 26 to 28, at the inner sides of the pair of left and right vertical walls 82e of the chassis 82, a pair of left and right resilient arms 127 are integrally molded horizontally, one at the top portion of an opening 125a of a left support pin fitting hole 125 and the other at the top portion an opening 125a of a right support pin fitting hole 125. As shown in FIG. 29, the left and right support pin 122 are inserted into the corresponding left and right support pin fitting holes 125 in the direction of arrow i that is an oblique direction from the openings 125a. Here, after the left and right arms 127 have opposed the resilient force once and have moved away in the direction of arrow j which is an upward direction, the insertion of the left and right support pins 122 into their corresponding left and right support pin fitting holes 125 is completed, and the pair of left and right resilient arms 127 are resiliently restored in the direction of arrow k which is a downward direction. Thereafter, the left and right support pins 122 are prevented from being accidentally dislodged from the corresponding openings 125a obliquely upward in a direction opposite to the direction of arrow k.

Therefore, while producing a tactile feel inside the pair of left and right support pin fitting holes 125 as a result of causing the pair of left and right support pins 122 to oppose the resiliency of the pair of left and right resilient arms 127, the pair of left and right support pins 122 can be rotatably supported by inserting them by a one-touch operation, thereby considerably facilitating the task of assembly.

Figure 4:
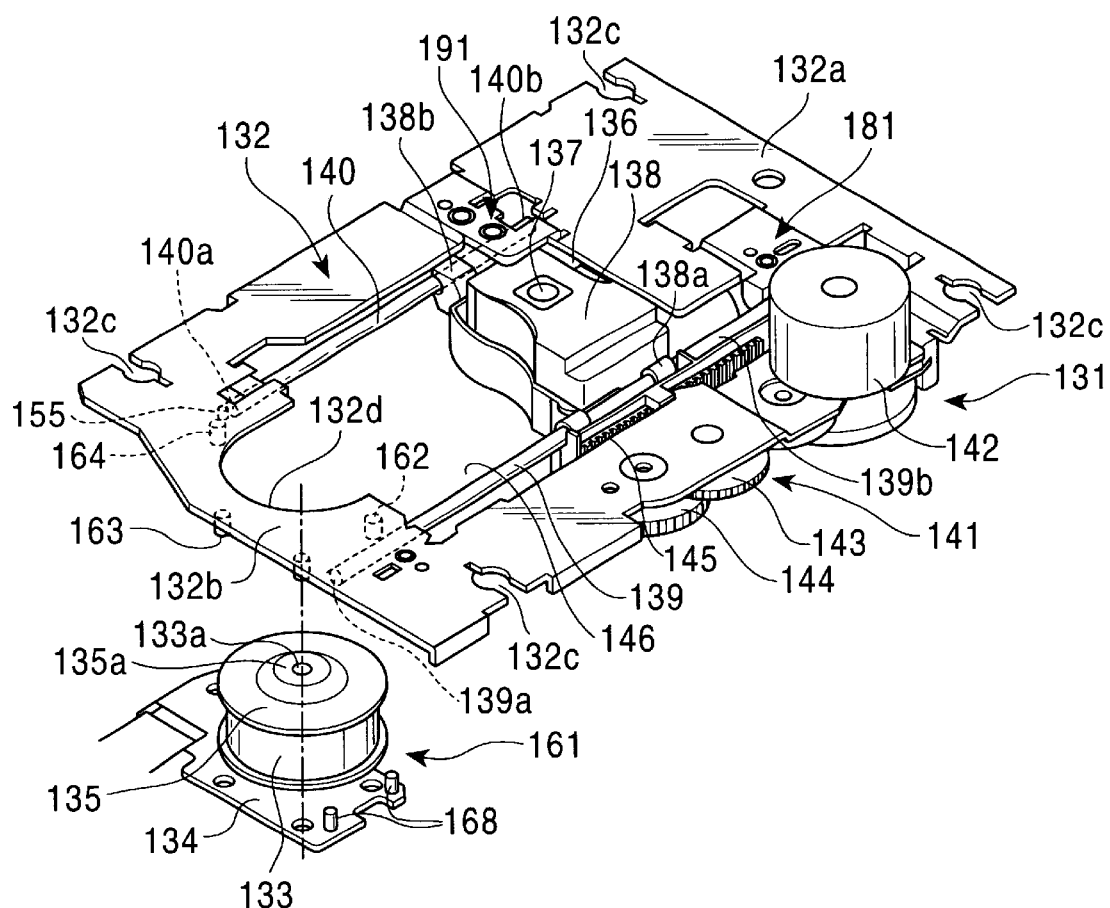
FIG. 4 is an exploded perspective view of a spindle motor shown in FIG. 3.
Figure 30:
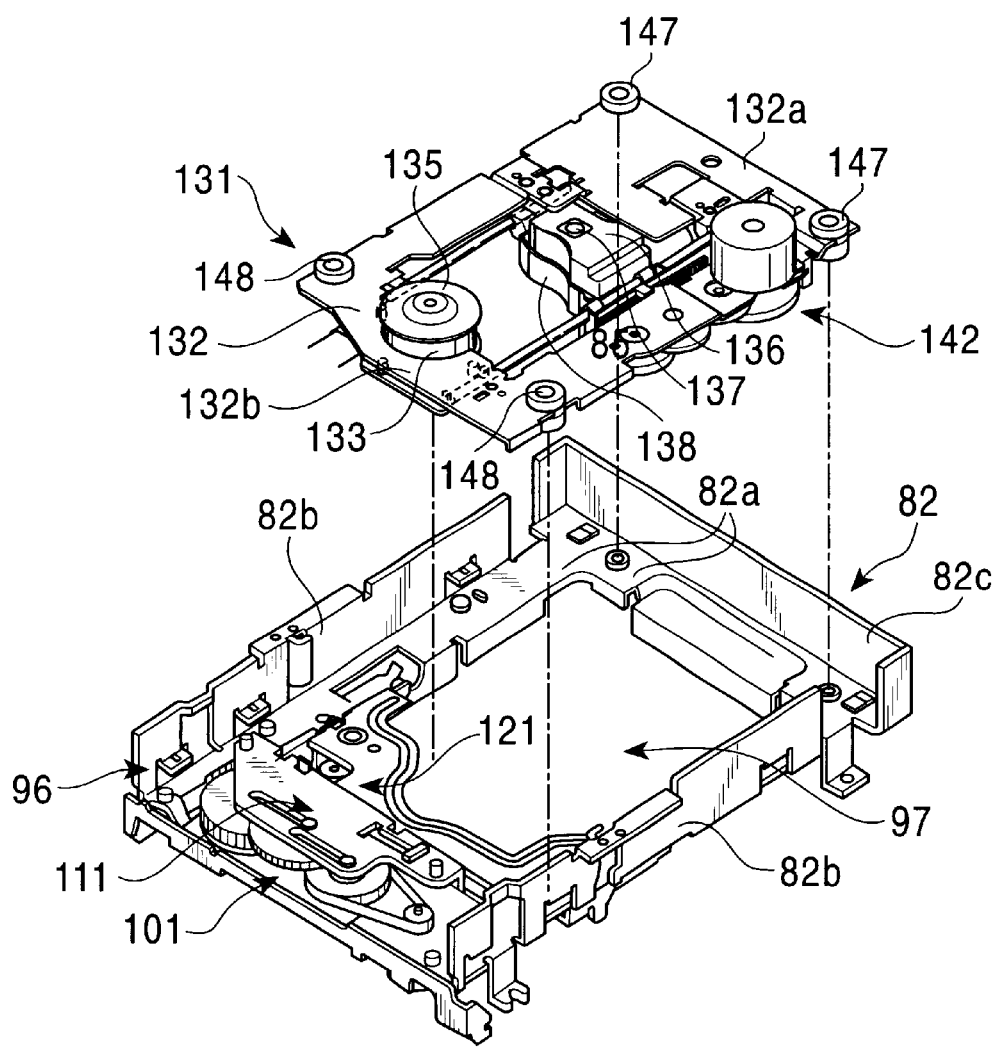
FIG. 30 is an exploded perspective view used to illustrate the assembly of the optical pickup unit of the optical disk device.
Figure 31:
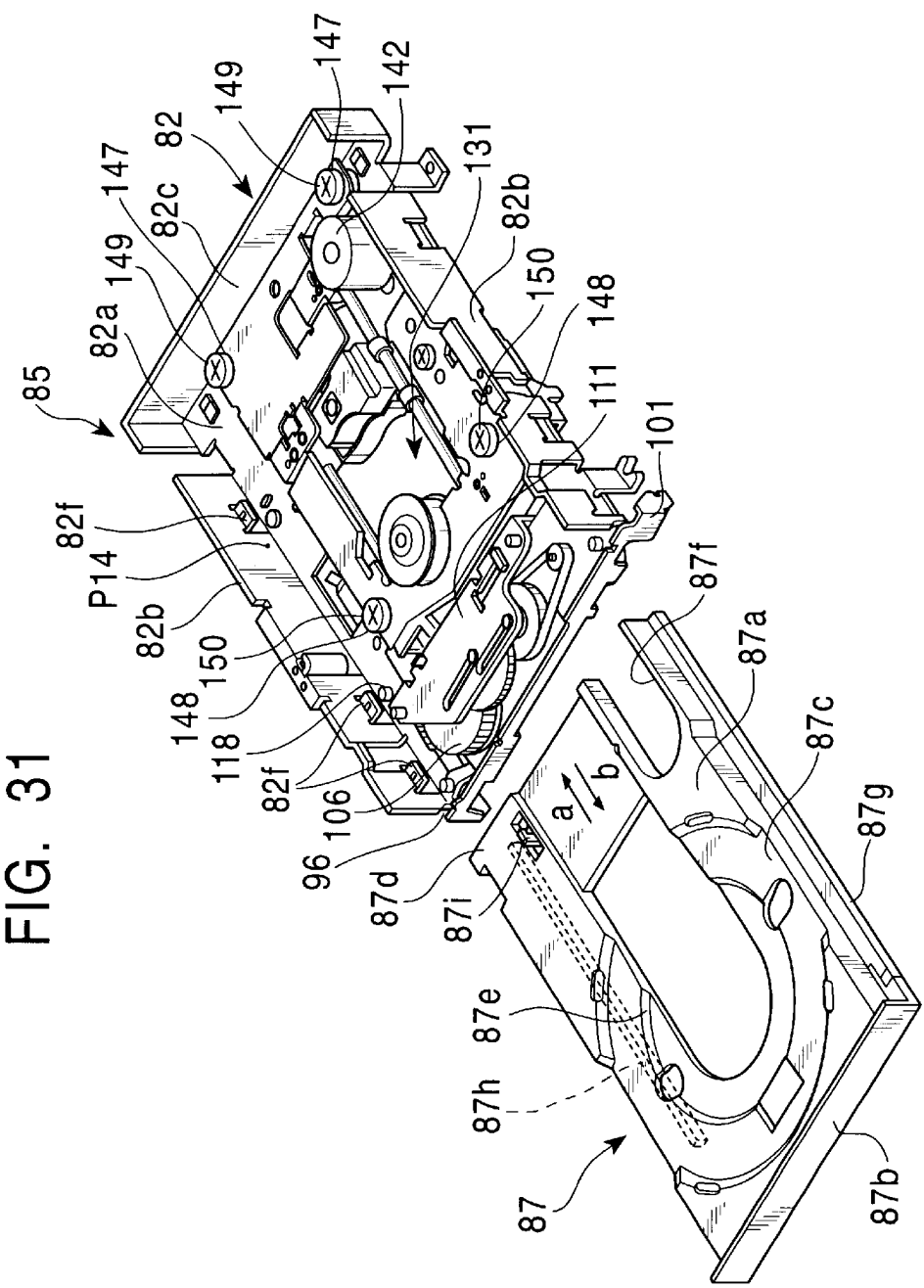
FIG. 31 is a perspective view used to illustrate the assembly of a disk tray of the optical disk device.

As shown in FIGS. 30 and 31, the intermediate portions of a total of four cylindrical, substantially "daruma-shaped" insulators 147 and 147 and 148 and 148, which are formed of rubber or the like, are inserted into a total of four insulator fitting portions 132c (see FIG. 4). One pair of the insulator fitting portions 132c are formed at the left and right sides of a back end 132a and the other pair of the insulator fitting portions 132c are formed at the left and right sides of a front end portion 132b of the ascending-and-descending frame 132 of the optical pickup unit 131. A pair of left and right set screws 149 which have been inserted into the centers of the pair of left and right insulators 147 at the back end side from thereabove are screwed into and mounted to a top portion of the back end side of the opening 97 of the horizontal wall 82a of the chassis 82 from thereabove in order to mount the back end portion 132a of the ascending-and-descending frame 132 to the top portion of the back end side of the horizontal wall 82a of the chassis 82 through the pair of left and right insulators 147. Similarly, a pair of the left and right set screws 148 which have been inserted into the centers of the pair of left and right pair of insulators 148 at the front end side from thereabove are screwed into and mounted to the top portion of the horizontal plate portion 121*a* of the ascending-and-descending actuation frame 121 from thereabove in order to mount the front end portion 132*b* of the ascending-and-descending frame 132 to the top portion of the ascending-and-descending actuation frame 121 through the pair of left and right insulators 148.

By the above-described operations, the optical pickup unit 131 is mounted to the top portion of the opening 97 of the chassis 82 through the four insulators 147, 147, 148, and 148 so that it extends between the back end side of the horizontal wall 82*a* of the chassis 82 and the top portion of the ascending-and-descending actuation frame 121.

Figure 37:
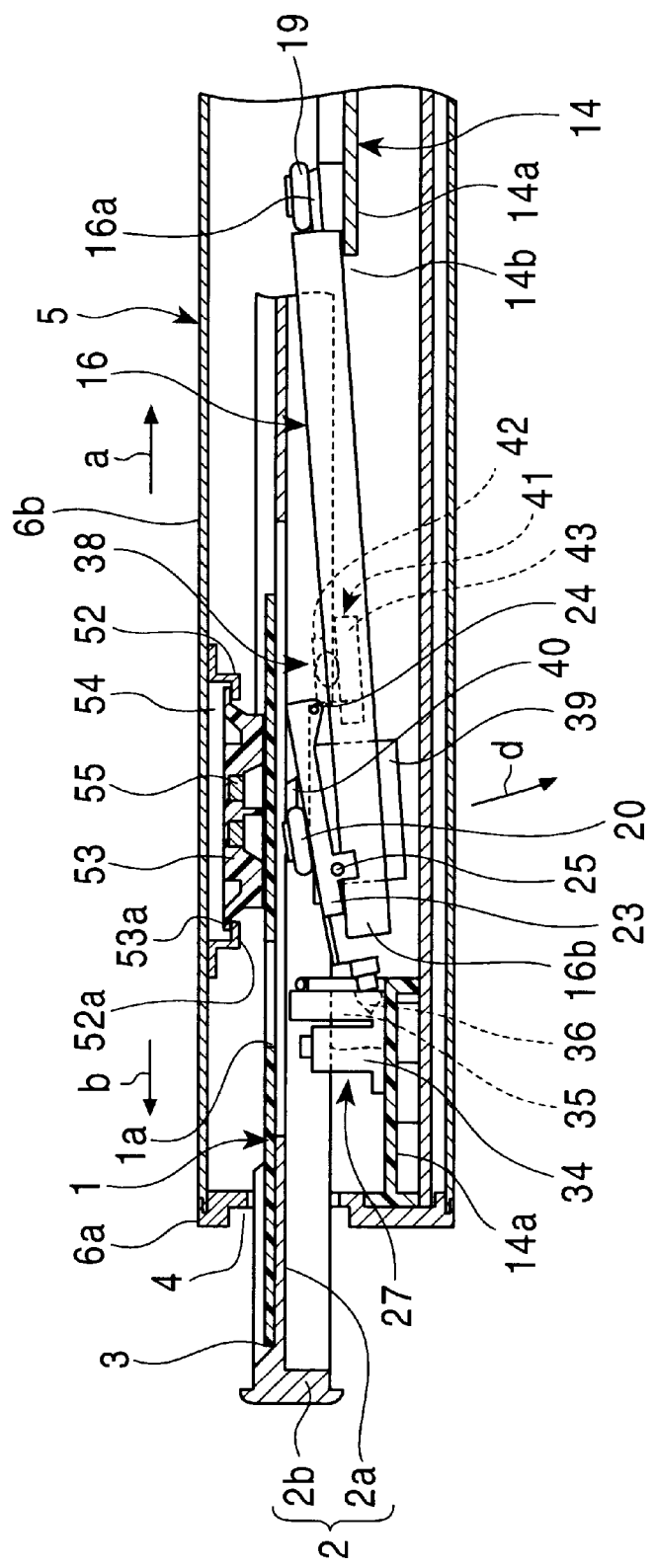
FIG. 37 is a side sectional view of FIG. 35.
Figure 38:
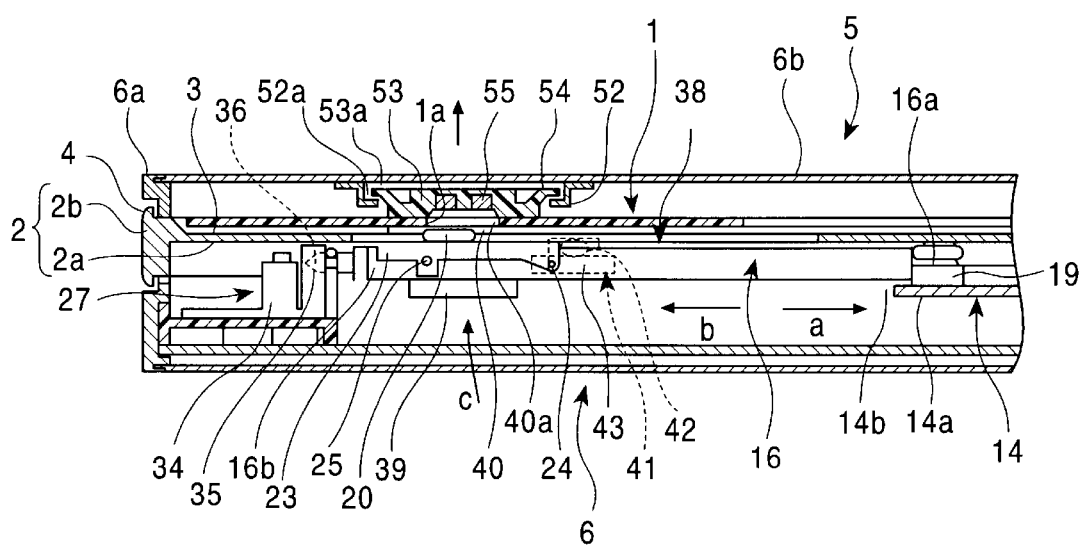
FIG. 38 is a side sectional view of FIG. 36.
Figure 39:
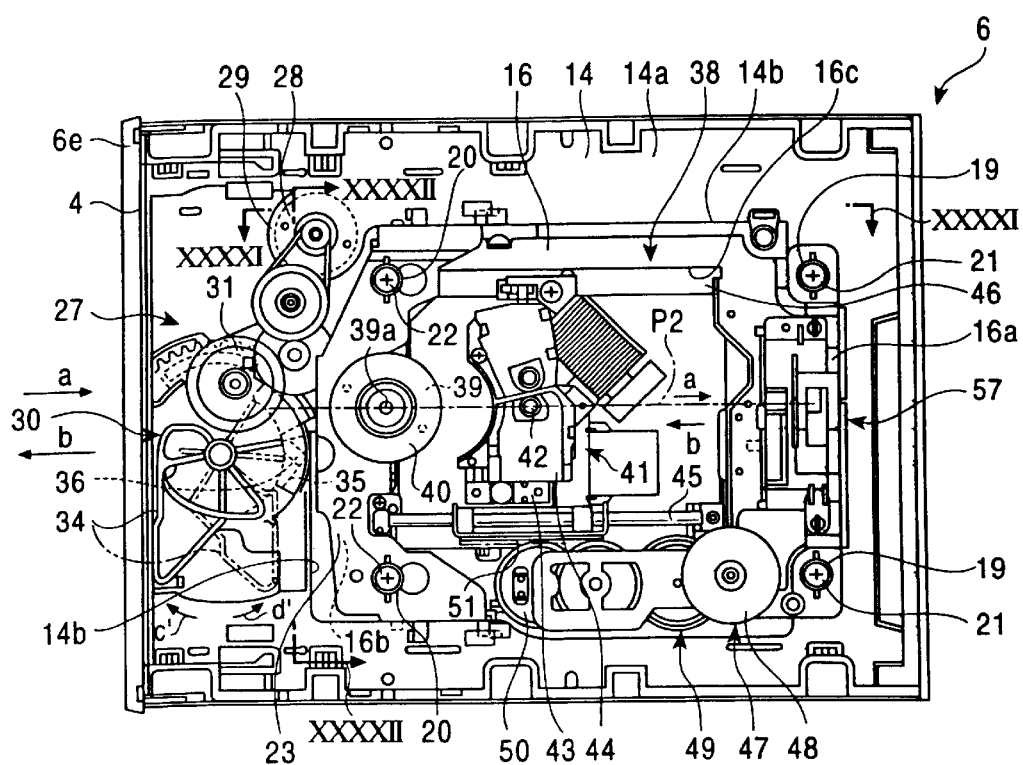
FIG. 39 is a plan view showing a state in which the top cover of FIG. 38 is removed.
Figure 40:
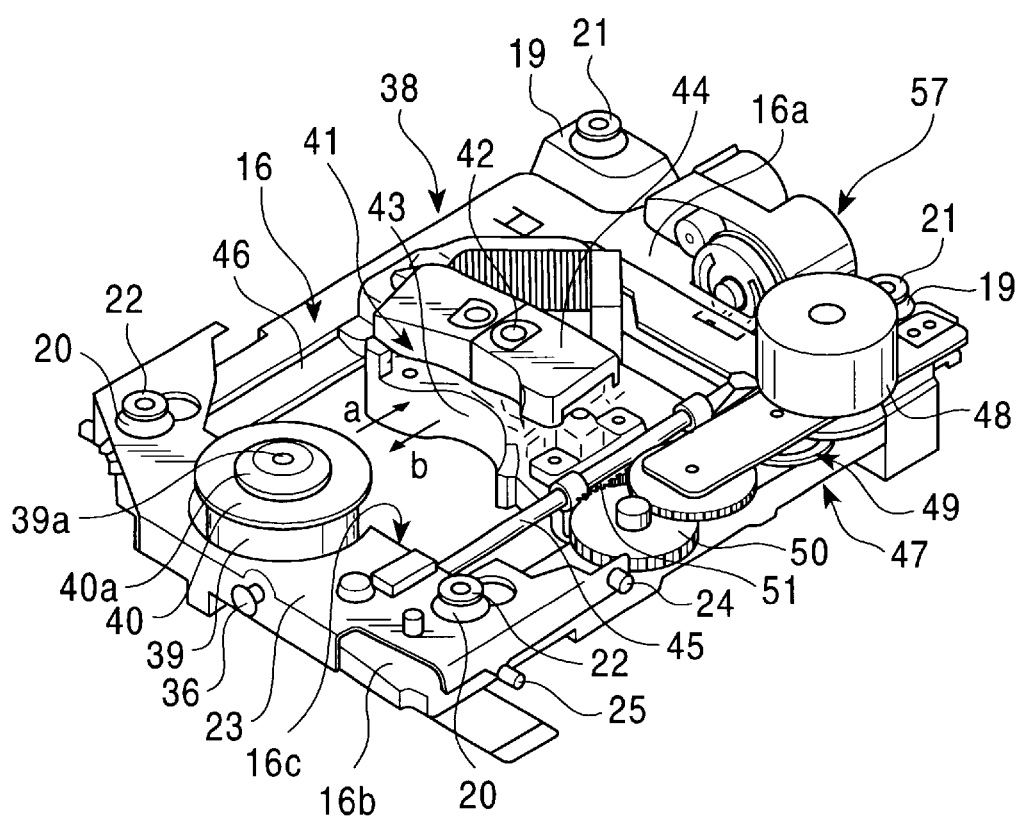
FIG. 40 is a perspective view of the optical pickup unit of the optical disk device.
Figure 41:
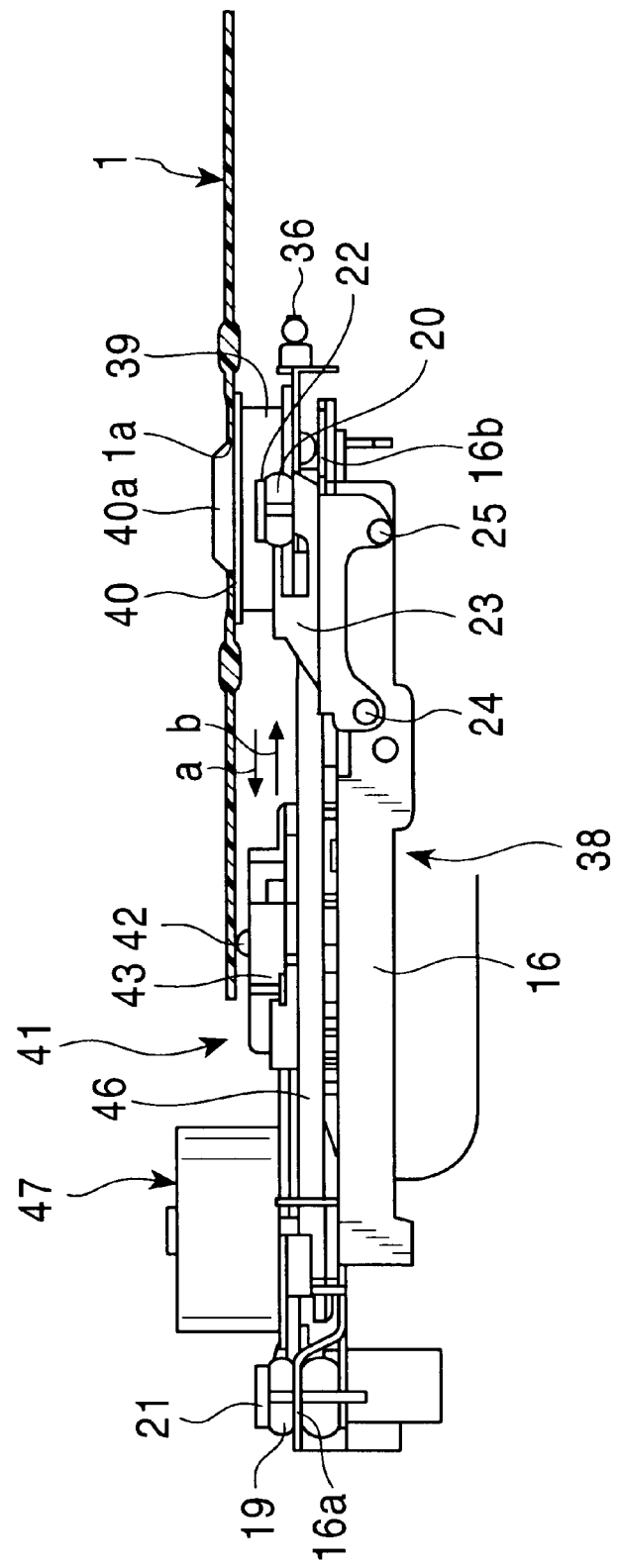
FIG. 41 is a side view taken along double-headed arrow XXXXI—XXXXI of FIG. 39.
Figure 42:
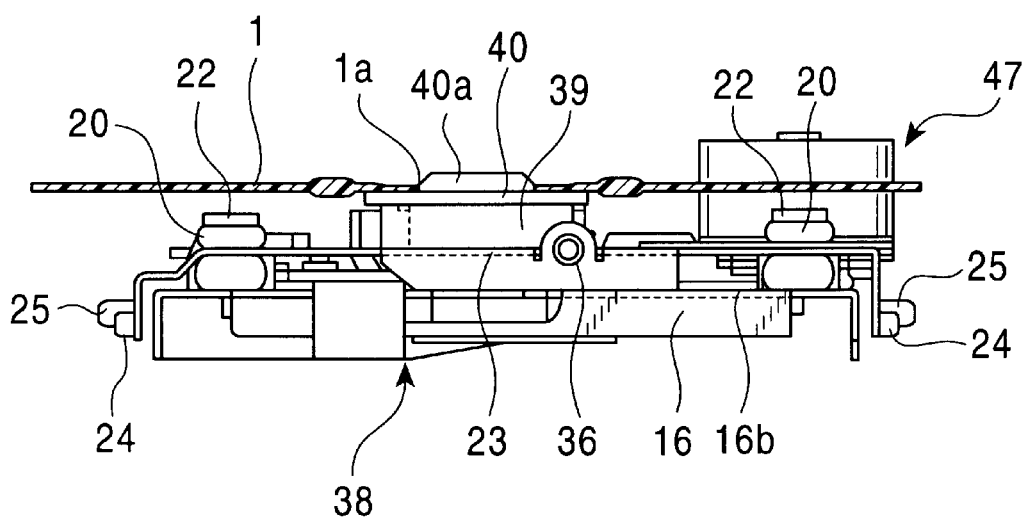
FIG. 42 is a side view taken along double-headed arrow XXXXII—XXXXII of FIG. 39.

The assembly operation is completed in such a manner that by the upward and downward actuation of the ascending-and-descending actuation frame 121 in the directions of arrows g and h (see FIG. 28), the optical pickup unit 131 is actuated so as to move up and down by a swinging movement between the descended position towards which the arrow d points (illustrated in FIG. 37) to the ascended position towards which the arrow c points (illustrated in FIG. 38), with the back-end pair of left and right insulators serving as rotational fulcra.

Figure 32:
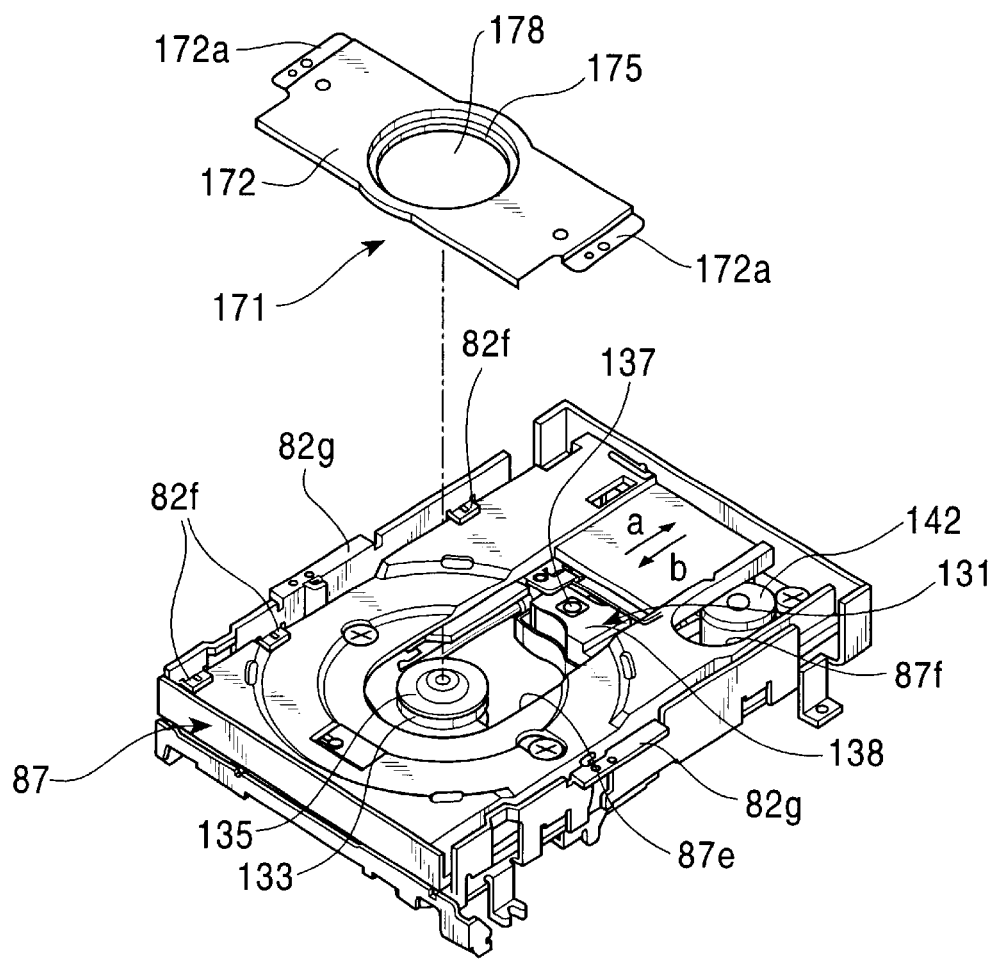
FIG. 32 is an exploded perspective view used to illustrate the assembly of a disk clamper supporting frame of the optical disk device.

As shown in FIGS. 31 and 32, the disk tray 87 is inserted horizontally in the direction of arrow a into and mounted to left and right side positions P14 of the top portion of the horizontal wall 82*a* from the front surface open section 96 of the chassis 82.

Here, the disk tray 87 is molded out of synthetic resin, and a vertically oblong tray front panel 87*b* is integrally molded with the front end of the horizontal tray body 87*a*. A substantially circular recess 87*c* is formed in the top portion of the front end side of the tray body 87*a*. A large, slot-shaped bottom surface opening 87*e* is formed along the tray centerline from the center portion of the recess 87*c* to a back end portion 87*d*. A cutaway 87*f* is formed in one side portion of the back end portion 87*d* as a relief cutaway with respect to a sled drive motor 142 of a sled moving mechanism 141 (described later). The cross-sectional shape of the tray body 87*a* in a direction perpendicular to the forward and backward directions (the directions of arrows a and b) is formed with a substantially U shape which faces downward and which is shallow. A pair of parallel left and right guide rails 87*g* are integrally formed on the tray body 87*a*, the left guide rail 87*g* on the left side and the right guide rail 87*g* on the right side of the tray body 87*a*, along the bottommost ends. Linear racks 87*h* which engage the upper gear 106 of the loading gear unit 101 are integrally formed at the other side of the bottom surface of the tray body 87*a* so as to be parallel to the directions of arrows a and b.

The left and right guide rails 87*g* of the disk tray 87 are inserted horizontally in the direction of arrow a to the left and right positions P14 of the horizontal wall 82*a*, at the inside of the left and right vertical walls 82*b* of the chassis 82. This causes the left and right guide rails 87*g* to be horizontally inserted into the lower portions of a plurality of tray holders 82*f* (which are punched out horizontally along the bottom ends of the insides of the left and right vertical walls 82*b*), and to be horizontally inserted into in the direction of arrow a and to be mounted inside the chassis 82 so that the tray 87*a* extends over the top portion of the slide frame 111 and the loading gear unit 101 towards the left and right. A resilient stopper 87*i* which is integrally formed with the bottom surface of one of the side portions of the tray body 87*a* resiliently opposes a stopper 118 which protrudes from the top portion of one of the side portions of the slide frame 111 and goes over it in the direction of arrow a.

Thereafter, the disk tray 87 is in contact with the stoppers 87*i* and 118, thereby preventing it from being accidentally dislodged from the chassis 82 in the direction of arrow b.

The rack 87*h* which is formed on the bottom surface of the disk tray 87 inserted into the chassis 82 in the direction of arrow a engages the upper gear of the output gear 106 of the loading gear unit 101.

Figure 33:
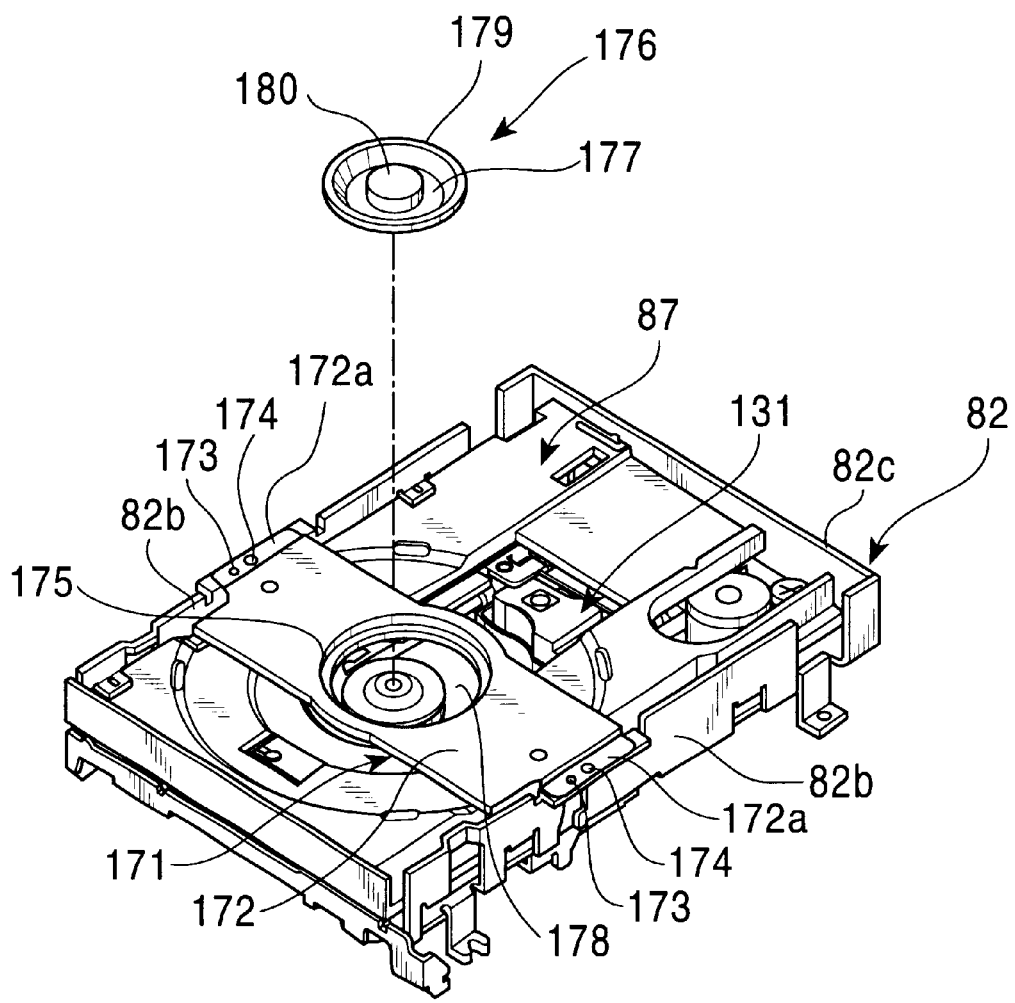
FIG. 33 is an exploded perspective view used to illustrate the assembly of a disk damper of the optical disk device.

As shown in FIGS. 32 and 33, left and right ends 172*a* of the disk damper supporting frame 172 of the disk damper unit 171 are horizontally placed on the top portion of left and right disk damper unit mounting portions 82*g* which are a pair of disk damper unit mounting portions and which are bent horizontally at the left and right vertical walls 82*b* of the chassis 82, and are positioned and screwed by pairs of left and right positioning pins 173 and left and right setscrews 174. With a play being provided, a disk damper 176, which is molded out of synthetic resin, is inserted into a circular recess 175 formed in the center portion of the disk damper supporting frame 172. Then, with a play being provided, a disk clamper section 177 which is a circularly convexed portion which protrudes from the center portion of the disk clamper 176 is inserted downward from a circular hole 178 formed concentrically with the center of the circular recess 175. When a flange 179 which is formed along the outer periphery of the top end of the disk clamper 176 is horizontally placed inside the circular recess 175, the disk damper 176 is horizontally provided so as to extend directly above the spindle motor (described later) for the optical pickup unit 131 while a play is provided. An annular magnet 180 is concentrically embedded into the top portion of the disk clamping section 177 of the disk damper 176.

Then, as shown in FIG. 34, the top cover 84, which is formed by pressing downward a sheet metal, such as a sheet iron, having a small thickness substantially into the shape of the letter U, is placed over the outer sides of the pair of left and right vertical walls 82*b* and the outer side of the back-end vertical wall 82*c* of the chassis 82, so that the top cover 84 is fitted into the chassis 82 from thereabove, whereby, by making use of the resiliency of the top cover 84, a plurality of stoppers 84*a* formed at the inner side of the top cover 84 are fitted into a plurality of stoppers 82*i* formed behind the total of three vertical walls 82*b*, 82*b*, and 82*c* of the chassis 82.

Lastly, as shown in FIG. 23, by fitting the front panel 83 to the outer sides of the front ends of the pair of left and right vertical walls 82*b* of the chassis 82 and the outer side of the U-shaped front end of the top cover 84 and by stopping them with a plurality of stoppers (not shown), the assembly of the optical disk device 81 shown in FIG. 23 is completed.

When the optical disk 1 is loaded, the optical disk 1 is placed horizontally inside the recess 87*c* of the disk tray 87 which is unloaded outside of the optical disk device 81 at the side towards which the arrow b points. Then, when the tray front panel 87*b* of the disk tray 87 is lightly pushed in the direction of arrow a, a loading switch is turned on, causing the loading motor 108 to be rotationally driven in the forward direction, so that the output gear 106 of the loading gear unit 101 is rotationally driven in the forward direction.

This causes the upper gear of the output gear 106 to actuate the rack 87*h* of the disk tray 87, so that the disk tray 87 is loaded into the optical disk device 81 in the direction of arrow a, whereby the optical disk 1 is incorporated into the optical disk device 81.

When the loading of the disk tray 87 is completed, the upper gear of the output gear 106 separates from the rack 87*h*. The separation causes the disk tray 87 to be positioned at a loading completion location by a positioning means (not shown), and, then, the forward rotational driving of the output gear 106 to bring the lower gear of the output gear 106 into engagement with the rack 117 at the slide frame 111, whereby the slide frame 111 is actuated by being slid in the direction of arrow e from the location indicated by alternate long and short dashed lines to the location indicated by a solid line shown in FIG. 29.

When the slide frame 111 is actuated by being slid, the pair of left and right cam grooves 112 are used to drive upward the pair of left and right cam driven pins 124 of the ascending-and-descending actuation frame 121 in the direction of arrow g from the location indicated by alternate long and short dashed lines to the location indicated by a solid line shown in FIG. 29. With the pair of left and right support pins 122 as centers, the ascending-and-descending actuation frame 121 is rotationally actuated in the direction of arrow g from the location indicated by alternate long and short dashed lines to the location indicated by a solid line shown in FIG. 28, causing the optical pickup unit 131 to move upward in the direction of arrow c from the descended location shown in FIG. 37 to the ascended position shown in FIG. 38, with the back end side pair of left and right insulators 147 serving as centers. The optical disk 1 is chucked onto a disk table 135 (described later) of the optical pickup unit 131 by the disk damper 176, and flies horizontally above the recess 87c of the disk tray 87. Then, at this moment, the loading motor stops automatically.

A recording command signal and/or a reproduction command signal is input from a host computer in order to rotationally drive the optical disk 1 by a spindle motor 133 (described later), whereby the recording of data onto and/or the reproduction of data from the optical disk 1 is carried out by the optical pickup unit 131.

When, after the completion of the recording of data onto and/or the reproduction of data from the optical disk 1, the eject button 89 is pushed, the loading motor 108 is driven in the reverse direction, causing the output gear 106 of the loading gear unit 101 to be rotationally driven in the reverse direction.

This causes the reverse operations to those carried out during the loading to be carried out. The slide frame 111 is actuated by being slid in the direction of arrow f from a location indicated by a solid line to a location indicated by alternate long and short dashed lines shown in FIG. 28. This causes the optical pickup unit 131 to be actuated downward in the direction of arrow d from the ascended position shown in FIG. 38 to the descended position shown in FIG. 37. The disk table separates from the disk damper 176 in the downward direction, whereby the optical disk 1 is placed inside the recess 87c of the disk tray 87. Thereafter, the disk tray 87 is unloaded in the direction of arrow b, so that the optical disk 1 is taken out from the optical disk device 81.

(2) Precision of Assembly of the Optical Pickup Unit

The precision of assembly of the optical pickup unit 131 will be described with reference to FIGS. 1 to 6. As shown in FIG. 3 to 6, the optical pickup unit 131, which is a pickup unit, is placed on the horizontal ascending-and-descending frame 132, which is formed by pressing a sheet metal such as an iron plate. The spindle motor 133 is vertically loaded at the front end portion 132b of the ascending-and-descending frame 132, and the disk table 135 is affixed to the top end of the motor shaft 133a of the spindle motor 133. A centering guide 135a, which is a truncated conical protrusion, is formed on the center top portion of the disk table 135. A substantially rectangular opening 146 is formed along substantially the center portion of the ascending-and-descending frame 132 so as to disposed behind the spindle motor 133 (that is, at the side towards which the arrow a points from the spindle motor 133). An optical pickup 136, which is a data pickup, is loaded inside the opening 146. The optical pickup 136 has a sled 138 to which an objective lens 137 is mounted, and a guide main shaft 139 and a guide sub-shaft 140 which are parallel to the directions of arrows a and b and which are used to guide the sled 138. The guide main shaft 139 and the guide sub-shaft 140 are mounted horizontally to the bottom portion of the ascending-and-descending frame 132 as a result of being disposed parallel to each other at the inner sides of the left and right sides of the opening 146.

In the structure, a sled moving mechanism 141 for moving the sled 138 to which the optical pickup 136 is mounted is mounted to the bottom portion of one of the side portions of the ascending-and-descending frame 132. The sled moving mechanism 141 comprises a sled drive motor 142, a gear train 143, a pinion 144 at the output end of the gear train 143, and a rack 145 mounted to one of the ends of the sled 138 and which is actuated by the pinion 144. The guide main shaft 139 is precisely positioned and mounted to the bottom portion of the ascending-and-descending frame 132. One of the ends of the sled 138 is slidably inserted by a pair of thrust bearings 138a with almost no play at the outer periphery of the guide main shaft 139. The other end of the sled 138 is slidably inserted with a slight play at the outer periphery of the guide sub-shaft 140. By the weight of the sled 138, the horizontal posture is stabilized.

The front ends (that is, the ends at the sides towards which arrow b points) of the guide main shaft 139 and guide sub-shaft 140 are formed as fixed ends 139a and 140a, respectively, whereas the back ends (that is, the ends at the sides towards which arrow a points) thereof are formed as movable ends 139b and 140b, respectively. The fixed end 139a of the guide main shaft 139 is affixed with high precision with a setscrew 151 as a result of positioning it in two directions with respect to the bottom surface of the ascending-and-descending frame 132 and a positioning reference portion 153 by a plate spring 152 mounted to the bottom portion of the ascending-and-descending frame 132. However, this results in slight movement of the guide main shaft 139 when a skew adjustment (described later) is carried out. The movable end 139b of the guide main shaft 139 is mounted to the bottom portion of the ascending-and-descending frame 132 by a skew adjusting mechanism 181 (described later). The fixed end 140a of the guide sub-shaft 140 is held by a holder 154 formed at the bottom portion of the ascending-and-descending frame 132, and is mounted thereto while in contact with a slide preventing protrusion 155 formed on the bottom surface of the ascending-descending frame 132. The movable end 140b of the guide sub-shaft 140 is also mounted to the bottom portion of the ascending-and-descending frame 132 by a skew adjusting mechanism 191 (described later).

A spindle motor mounting mechanism 161 is described with reference to FIGS. 1 to 5. A spindle motor inserting portion 132d, which is a semicircular cutout, is formed in substantially the center portion of the front end portion 132b of the ascending-and-descending frame 132. The spindle motor 133 is inserted into the spindle motor inserting portion 132d, and a horizontal motor base 134 formed at the bottom portion of the spindle motor 133 is mounted to the bottom portion of the ascending-and-descending frame 132 from therebelow using three setscrews 165, 166, and 167 through three space pins 162, 163, and 164, which are spacers.

In this way, when the spindle motor 133 is mounted to the bottom portion of the ascending-and-descending frame 132 through the three space pins 162, 163, and 164 so as to form a step, a height H1 of the disk table 135 from the ascending-and-descending frame 132 can be made small, so that the shaking of the core of the spindle motor 133 can be considerably reduced. In particular, when carrying out a high-density recording and/or reproducing of data by rotationally driving the optical disk 1 in which there is a center-of-gravity imbalance, highly precise recording and/or reproducing of data can be carried out.

Figure 5:
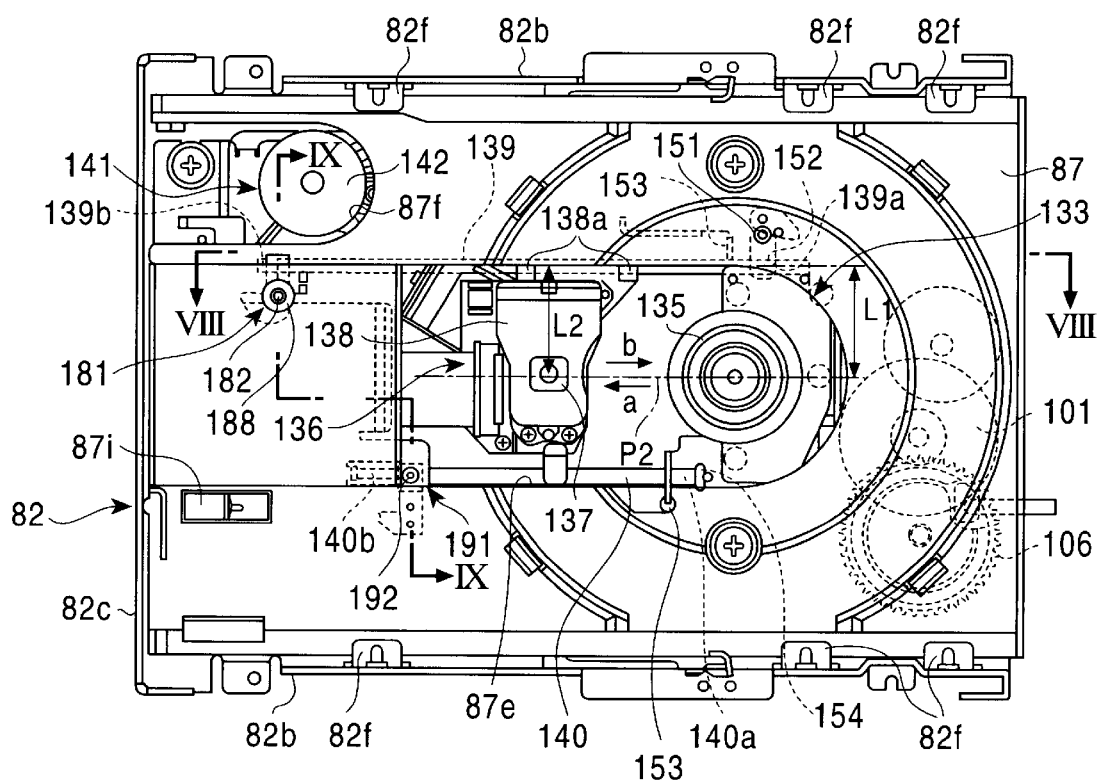
FIG. 5 is a plan view showing a state in which a top cover of the optical disk device is removed.
Figure 6:
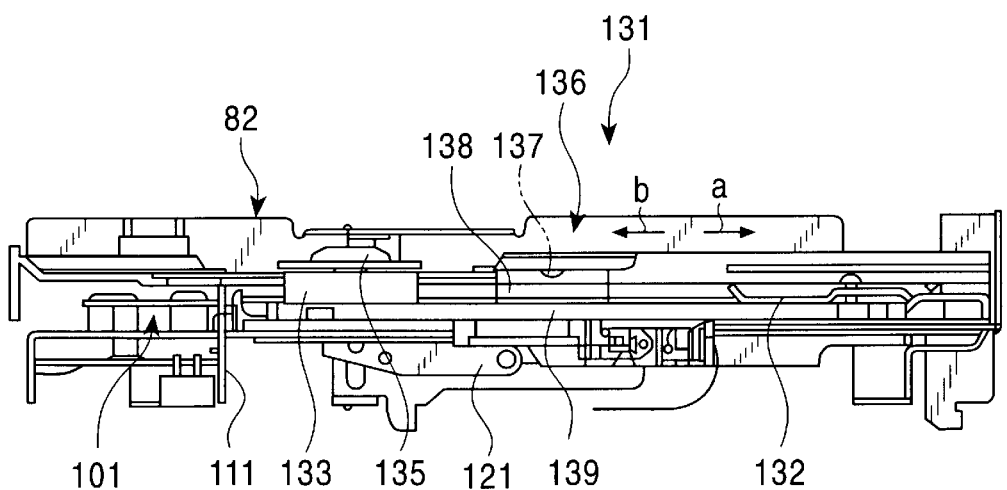
FIG. 6 is a sectional side view of the optical disk device shown in FIG. 5.

As shown in FIG. 5, when a recording operation and/or reproducing operation is carried out on the optical disk 1, which is a high-capacity disk (that is, a high-density disk), it is necessary for the center (that is, the optical axis) of the objective lens 137 of the optical pickup 136 to be parallel to the center of the guide main shaft 139, and to be set with high precision on a seek reference line P2 passing through the center of the spindle motor 133. In order to achieve this, it is necessary to match with high accuracy a length (interval) L1 between the center of the spindle motor 133 and the center of the guide main shaft 139 and a length (interval) L2 between the center of the objective lens 137 and the center of the guide main shaft 139.

Here, as mentioned above, the thrust bearing 138a of the sled 138 is inserted with high precision with almost no play at the outer periphery of the guide main shaft 139, so that the interval L2 between the objective lens 137 and the guide main shaft 139 is set at a certain value with high accuracy. Therefore, based upon the precision of the assembly of the spindle motor 133 to the ascending-and-descending frame 132, the interval L2 between the spindle motor 133 and the guide main shaft 139 must be set so as to match L1 with high accuracy.

To overcome this problem, in the spindle motor mounting mechanism 161, while two positioning pins 168 which are positioning means implanted in the top portion of the motor base 134 with high precision are pushed against a side surface of the guide main shaft 139 in the direction of arrow x (see FIGS. 14 and 15), the motor base 134 is secured to the bottom portions of the three space pins 162, 163, and 164 with the three setscrews 165, 166, and 167. This has allowed the interval L1 between the spindle motor 133 and the guide main shaft 139 to be successfully made equal the interval L2 between the objective lens 137 and the guide main shaft 139.

In other words, the spindle motor mounting mechanism 161 allows the guide main shaft 139 itself to be set at a common positioning reference for the spindle motor 133 and the objective lens 137 in order to mount the spindle motor 133 and the objective lens 137 to the ascending-and-descending frame 132, so that the two intervals L1 and L2 can be made to match with high accuracy. In addition, since, in the spindle motor mounting mechanism 161, the two positioning pins 168 implanted in the motor base 134 are only pushed against a side surface of the guide main shaft 139, the structure thereof becomes very simple, thereby making it possible to promote reduced costs.

Figure 7:
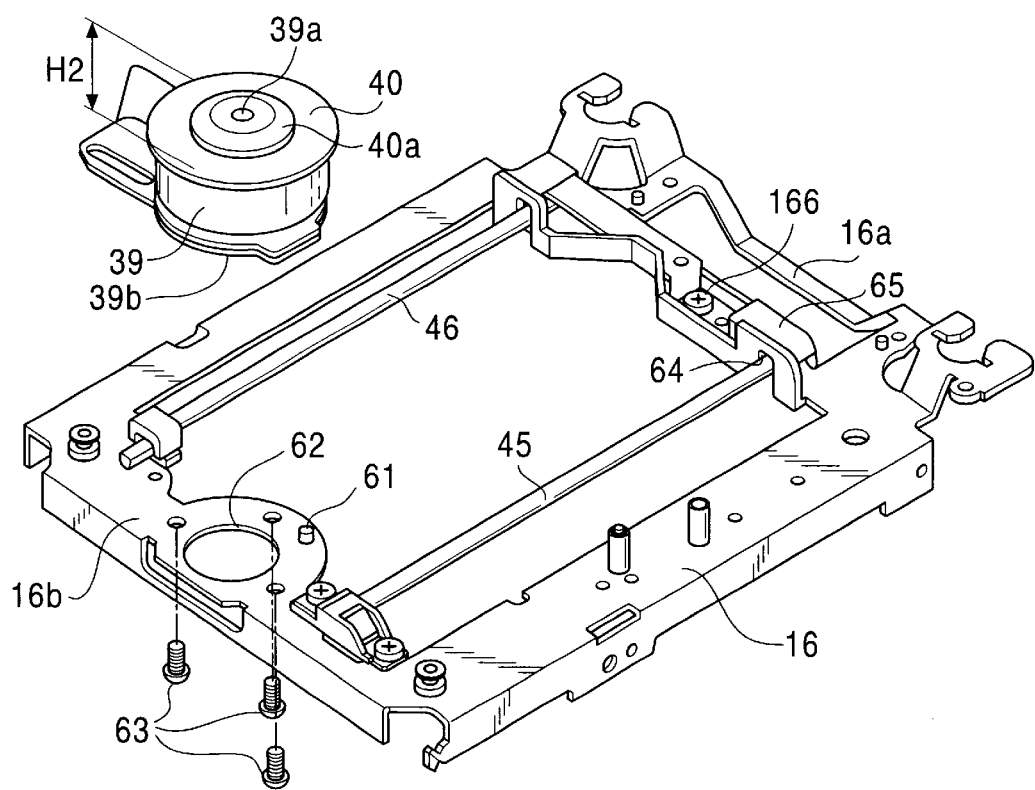
FIG. 7 is an exploded perspective view used to illustrate a conventional spindle motor mounting mechanism.

FIG. 7 illustrates a mechanism for mounting the conventional spindle motor 39. While the horizontal motor base 39b disposed at the bottom end of the spindle motor 39 is fitted to and positioned at the reference hole 62 and the positioning pin 61 implanted in the ascending-and-descending frame 16 from thereabove, the motor base 39b is screwed to the ascending-and-descending frame 16 using a plurality of setscrews 63 from therebelow, and the guide main shaft 45 is vertically pushed against and positioned at the positioning reference portion 64 formed by bending a portion of the ascending-and-descending frame 16.

However, in this method, the spindle motor 39 and the guide main shaft 45 are positioned with respect to the ascending-and-descending frame 16, so that the interval between the center of the objective lens 42 and the center of the guide main shaft 45 and the interval between the center of the spindle motor 39 and the center of the guide main shaft 45 are not directly adjusted. Therefore, variations occur in the interval between the center of the spindle motor 39 and the center of the guide main shaft 45 and the interval between the center of the spindle motor 39 and the center of the guide main shaft 45 due to shifts in the position of the positioning reference portion 64, and the reference hole 62 and the positioning pin 61 of the ascending-and-descending frame 16. When such variations occur, high-density recording and/or reproducing operations of the optical disk 1 cannot be carried out. In order to make such variations small, it is necessary to increase the precision with which each component part is formed, resulting in considerably increased costs.

Figure 1:
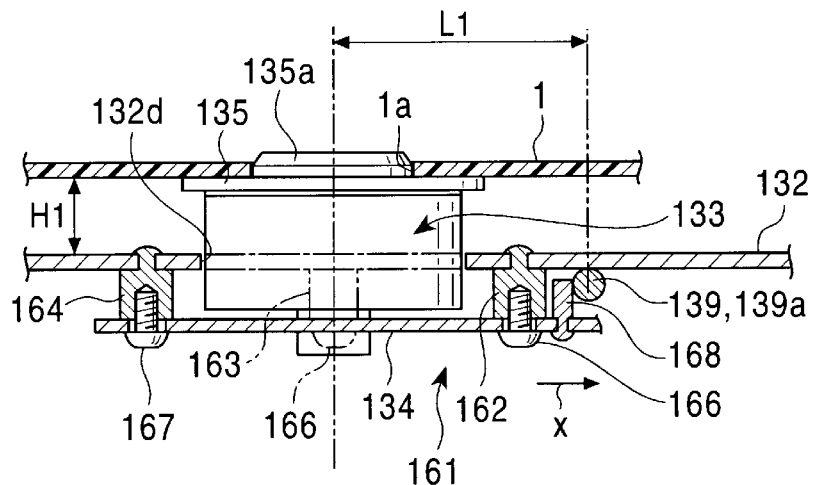
FIG. 1 is a sectional view taken along double-headed arrow I—I of FIG. 2, illustrating a spindle motor mounting mechanism in an embodiment of an optical disk device to which the present invention is applied.
Figure 2:
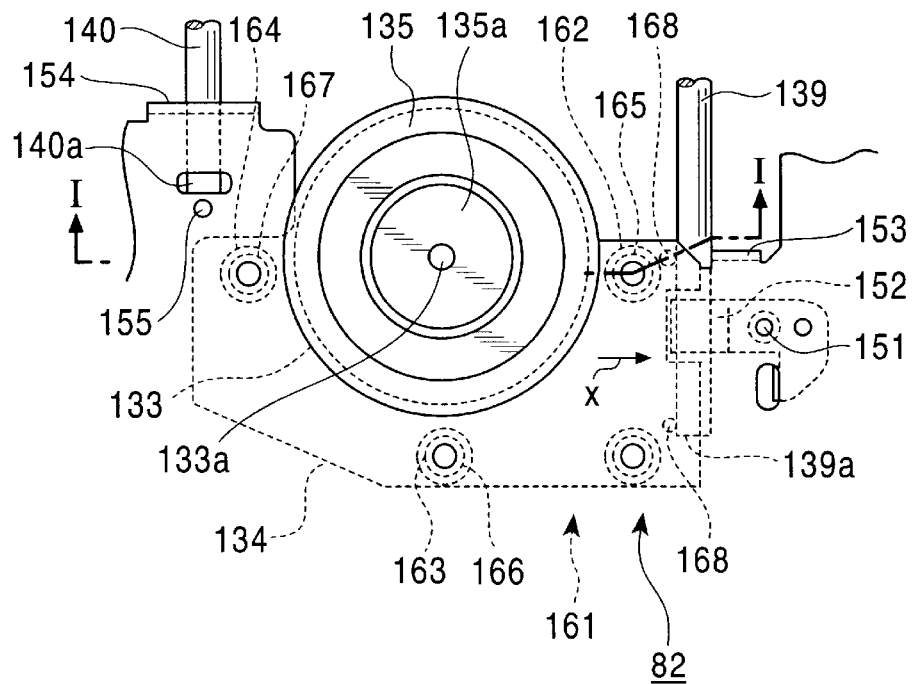
FIG. 2 is a plan view of FIG. 1
Figure 3:
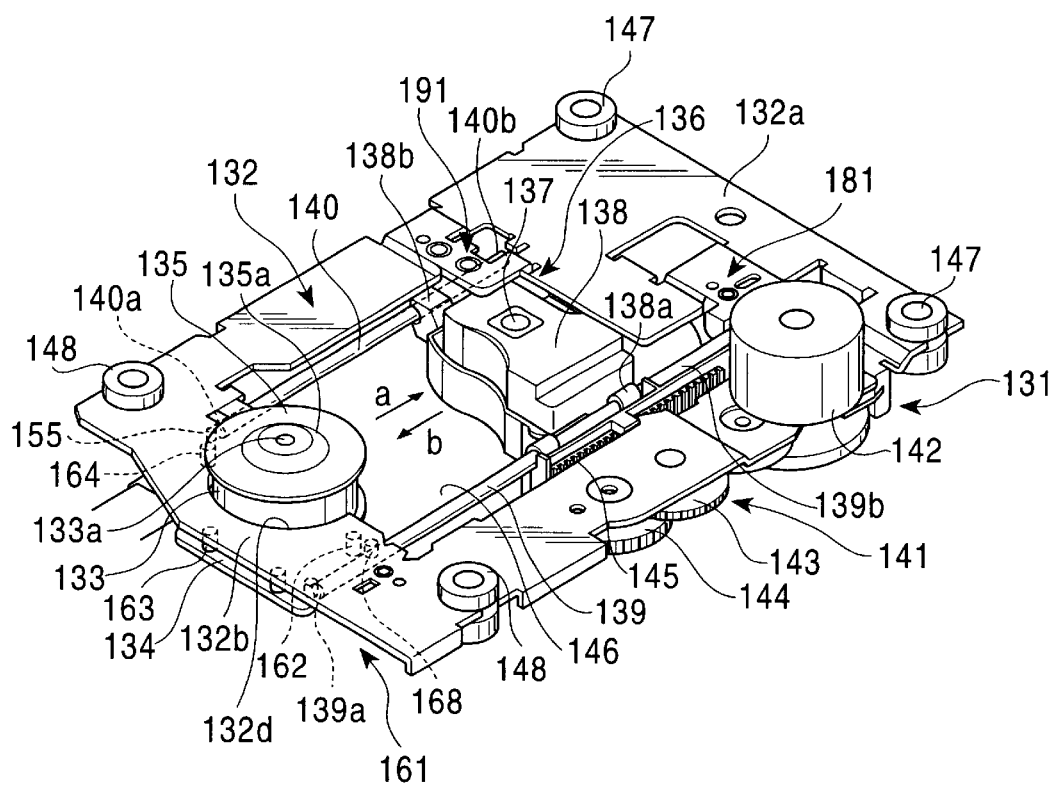
FIG. 3 is a perspective view of the whole optical pickup unit of the optical disk device.

Further, in the spindle motor mounting mechanism, the spindle motor 39 is mounted to the top portion of the ascending-and-descending frame 16, so that a height H2 measured from the disk table 40 to the ascending-and-descending frame 16 becomes at least approximately twice the height H1 in the present invention shown in FIG. 1. As a result, core shaking during the rotation of the spindle motor 39 tends to occur. In particular, violent core shaking occurs when the optical disk 1 in which there is a center-of-gravity imbalance is rotated at a high speed, thereby preventing recording and/or reproducing operations of high-density data.

(3) First Form of a Skew Adjusting Mechanism

A first form of the skew adjusting mechanism will be described with reference to FIGS. 8 to 13. Skew adjusting mechanisms 181 and 191 are provided, respectively, at the movable ends 139b and 140b of the corresponding guide main shaft 139 and the guide sub-shaft 140. Since the skew adjusting mechanisms 181 and 191 have the same structure, the skew adjusting mechanism 181 at the guide main shaft 139 will only be described in detail. For the skew adjusting mechanism 191 at the guide sub-shaft 140, corresponding opposite parts will be labeled with corresponding reference numerals, so that details thereof will not be given below.

In the skew adjusting mechanism 181 at the guide main shaft 139, a skew adjustment screw 182 is mounted to a location directly above the movable end 139b of the guide main shaft 139 so as to pass through the ascending-and-descending frame 132 downward. Then, using a setscrew 183 which has been passed through a screw insertion hole 184c, formed in the fixed end 184a of the plate spring 184 below the ascending-and-descending frame 132, from therebelow, the fixed end 184a is affixed to the bottom surface of the ascending-and-descending frame 132. Here, a dowel hole 184d which is formed in the fixed end 184a is fitted onto a positioning dowel pin 187 which is formed on the bottom surface of the ascending-and-descending frame 132 in order to fit a bent portion 184e inside a positioning hole 186 from therebelow. The bent portion 184e is formed by bending a side portion of the fixed end 184a upward so as to be perpendicular to the length direction of the plate spring 184. The positioning hole 186 is formed in the ascending-and-descending frame 132. After the bent portion 184e has been fitted, the plate spring 184 is positioned with high precision while it is perpendicular to the guide main shaft 139.

A movable end 184b, formed by bending a portion of the plate spring 184 into a substantially V shape, is obliquely pushed against the movable end 139b of the guide main shaft 139 downward and to one side. By the oblique upward pushing force of the movable end 184a, the movable end 139b of the guide main shaft 139 is pushed against two locations, that is, the bottom end of the skew adjustment screw 182 and a positioning reference portion 185 which extends vertically downward from the ascending-and-descending frame 132 in order for the movable end 139b of the guide main shaft 139 to be positioned.

Figure 8:
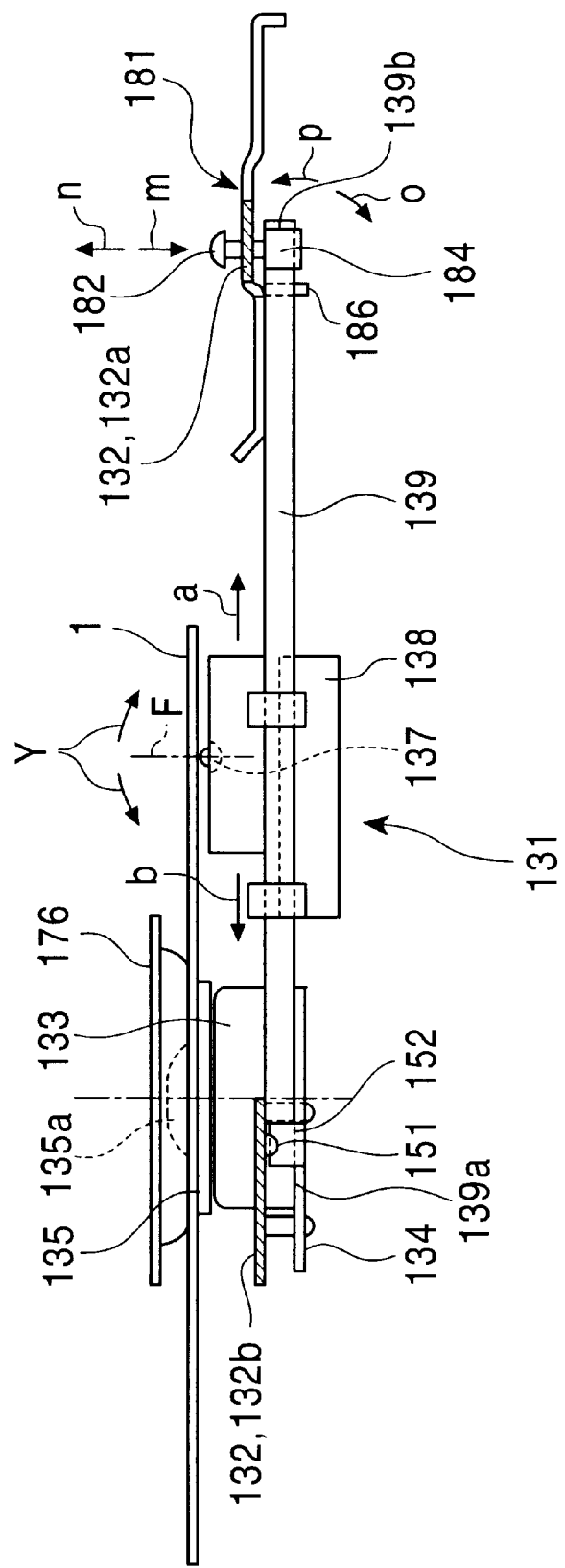
FIG. 8 is a sectional view taken along double-headed arrow VIII—VIII of FIG. 5, illustrating a first form of a skew adjusting mechanism of the optical disk in accordance with the present invention.
Figure 9:
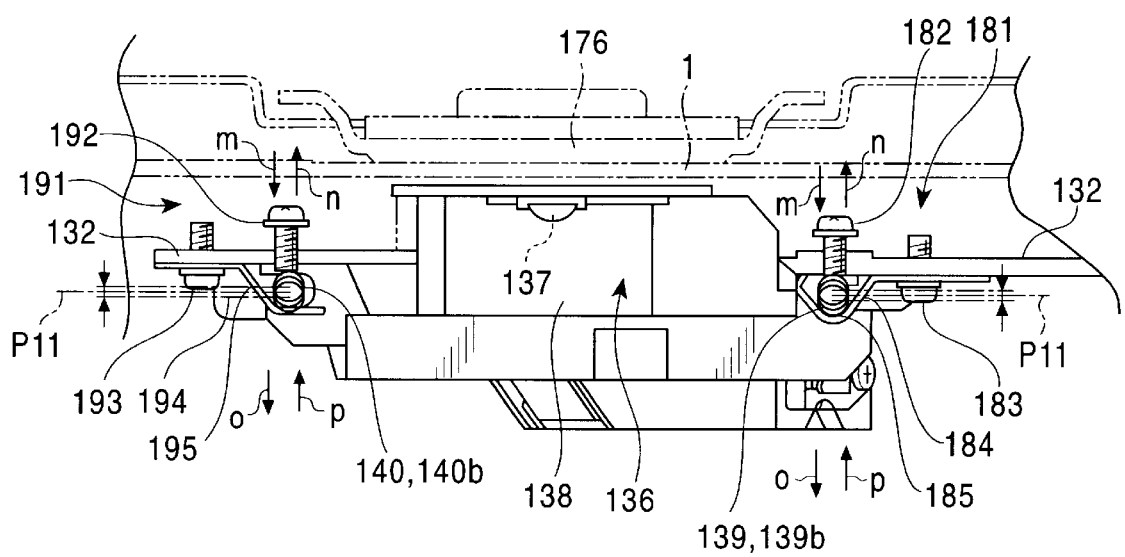
FIG. 9 is a sectional view taken along double-headed arrow IX—IX of FIG. 5.
Figure 10:
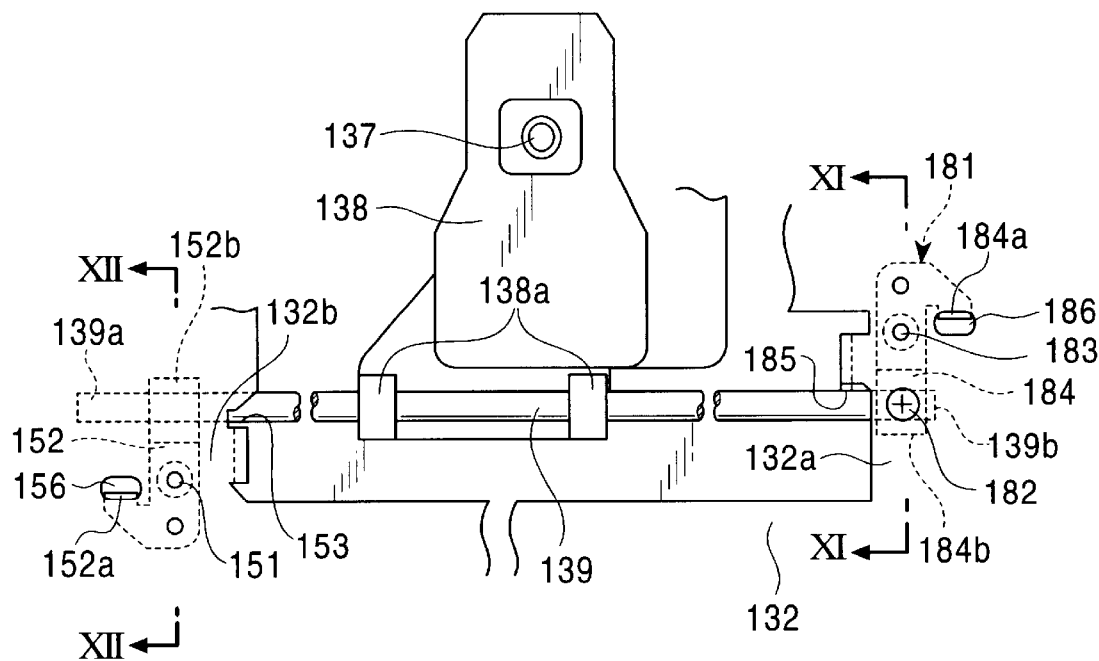
FIG. 10 is an enlarged partly cutaway plan view of FIG. 8.
Figure 11:
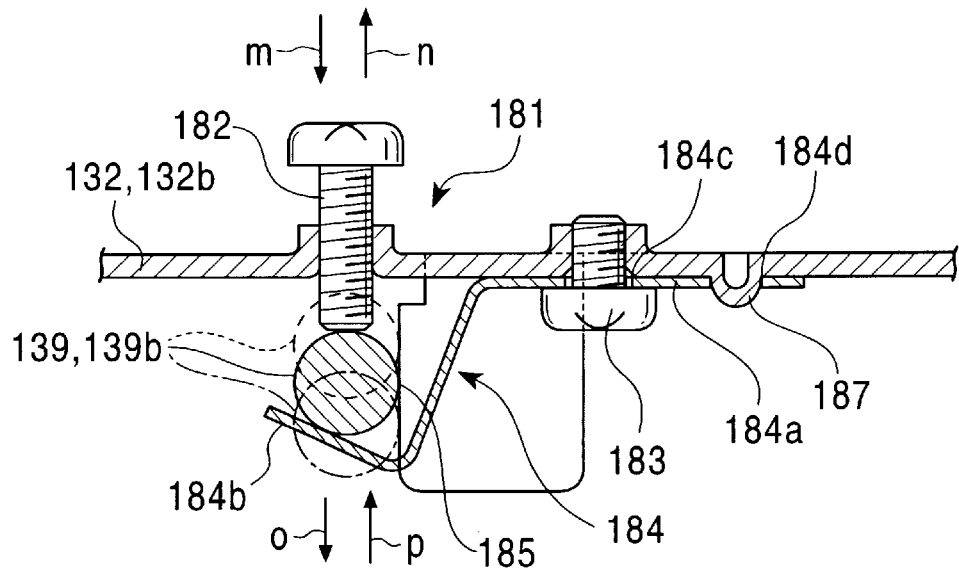
FIG. 11 is an enlarged sectional view taken along double-headed arrow XI—XI of FIG. 10.
Figure 12:
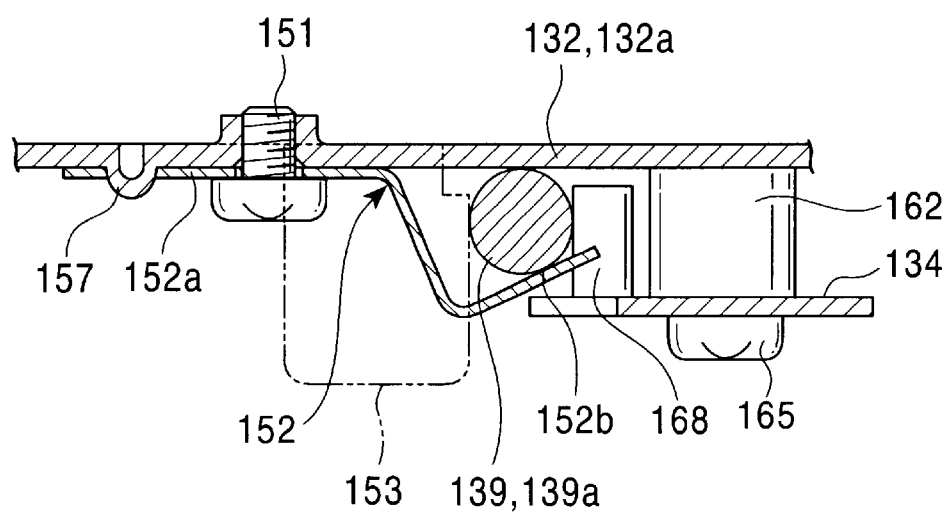
FIG. 12 is an enlarged sectional view taken along double-headed arrow XII—XII of FIG. 10.
Figure 13:
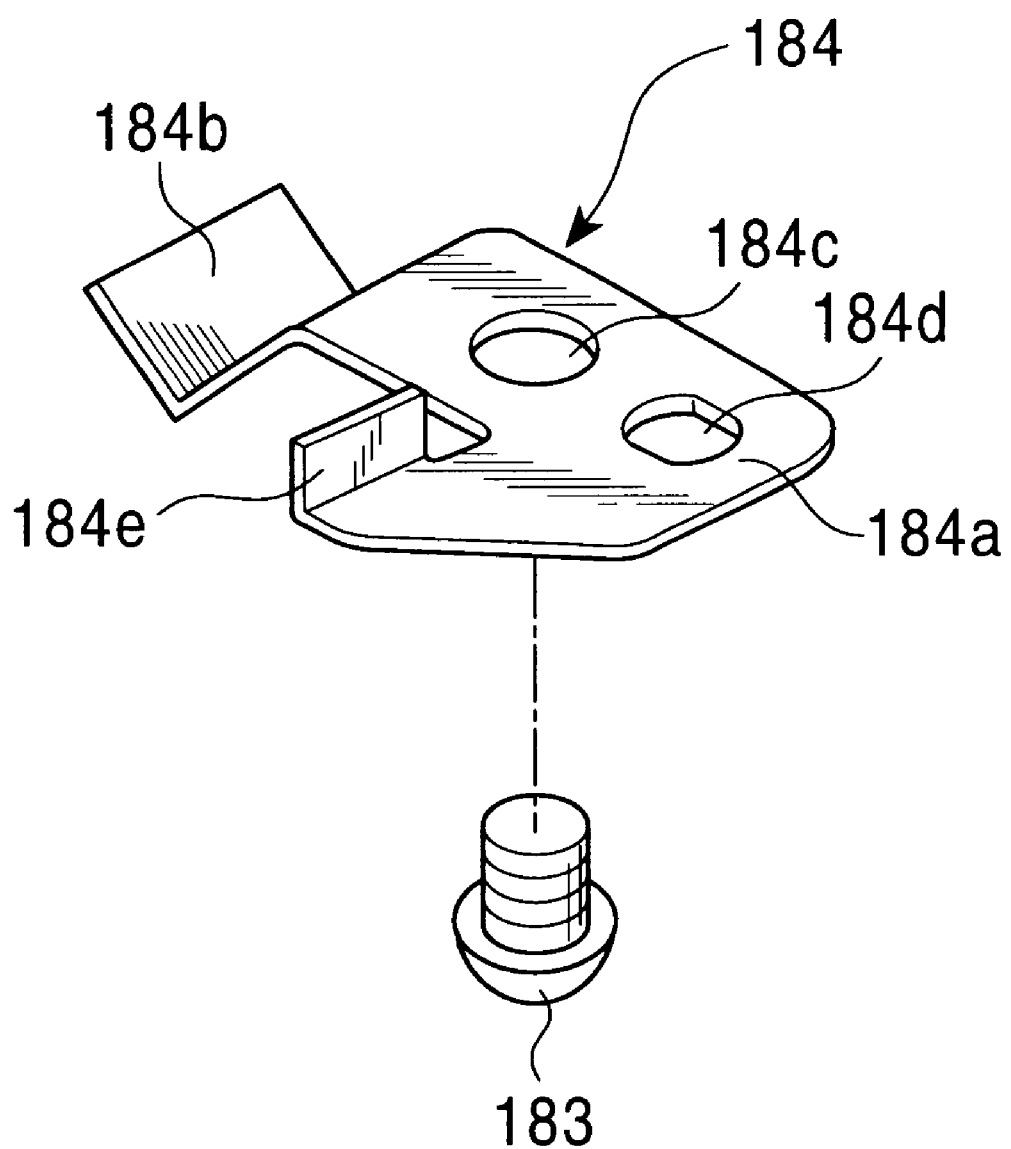
FIG. 13 is a perspective view of a plate spring which is used in the skew adjusting mechanism.

In the skew adjusting mechanism 181, when the height of the skew adjustment screw 182 in the directions of arrows m and n which are upward and downward directions is adjusted, the movable end 139b of the guide main shaft 139 goes against the spring force of the movable end 184b of the plate spring 184, and its height is adjusted in the directions of arrows o and p which are upward and downward directions, along the positioning reference portion 185. As shown in FIG. 8, the angle of the movable end 139b of the guide main shaft 139 is adjusted in the directions of arrows o and p which are upward and downward directions, with the fixed end 139a serving as rotational fulcrum. Then, the tilting of the sled 138 is integrally adjusted along with the guide main shaft 139 in the direction of arrow y in order to perform a skew adjustment operation so that the skew angle with respect to the optical disk 1 on an optical axis F of the objective lens 137 is vertically adjusted.

Here, the skew adjustment operation in the tangential direction is carried out using either one of the two adjustment screws 182 and 192 of the two skew adjusting mechanisms 181 and 189, or both of the adjustment screws 182 and 192 of the skew adjusting mechanisms 181 and 189 by adjusting them vertically in opposite directions. The skew adjustment operation in the radial direction is carried out using the two skew adjustment screws 182 and 192 by moving them vertically in the same direction.

In particular, when the tilting of the guide main shaft 139 in the directions of arrows o and p is adjusted, the fixed end 139a of the guide main shaft 139 is slightly tilted in the vertical direction, along the positioning reference portion 153. Here, the fixed end 139a of the guide main shaft 139 is slightly tiled in the vertical direction, along side surfaces of the two positioning pins 168. Even when a skew adjustment of the guide main shaft 139 is carried out, the interval L1 between the center of the guide main shaft 139 and the center of the spindle motor 133 shown in FIG. 1 does not change at all. Therefore, skew adjustment can be assuredly carried out without adversely affecting the precision with which the spindle motor 133 is mounted.

As shown in FIG. 5, while the optical disk 1 is chucked to the top portion of the disk table 135 after loading the disk tray 87 into the disk device body 85 in the direction of arrow a, the two upward facing skew adjustment screws 182 and 192 are disposed at the outer sides of the optical disk 1, and a hole 188 for inserting a tool, such as a driver, is formed in a location directly above the skew adjustment screw 182 at the disk tray 85. The skew adjustment screw 192 is disposed inside the corner of the bottom surface opening 87e of the disk tray 87.

This causes the optical disk 1 to be rotationally driven at a high speed by the spindle motor 133. While reproducing initial data from the optical disk 1 by the optical pickup 136, a skew adjustment operation by the skew adjustment screw 182 can be carried out by passing a tool, such as a driver, through the tool insertion hole 188 from thereabove, or a skew adjustment operation by the skew adjustment screw 192 can be carried out by passing a tool, such as a driver, through the corner inside the bottom surface opening 87e of the disk tray 87 from thereabove, so that skew adjustment operations can be carried out easily, quickly, and very precisely.

(4) Second Form of a Skew Adjusting Mechanism

A second form of the skew adjusting mechanism will be described with reference to FIGS. 14 and 15. A skew adjusting mechanism 201 is constructed so that the tilting of the spindle motor 133 with respect to the ascending-and-descending frame 132 is adjusted.

More specifically, of the three space pins 162, 163, and 164 which are implanted in the bottom surface of the aforementioned ascending-and-descending frame 132, the two space pins 162 and 164 disposed at the left and right sides are used. In addition, a new space pin 202 is vertically implanted in a location at the front side (that is, the side towards which arrow b points) of the space pin 162, at the bottom surface of the ascending-and-descending frame 132. Three compression coil springs 206, 207, and 208 are inserted into the outer peripheries of the three space pins 162, 164, and 202. Three skew adjustment screws 203, 204, and 205 which have been inserted into the motor base 134 from therebelow oppose the three compression coil springs 206, 207, and 208 and are screwed into the three space pins 162, 164, and 202. The three compression coil springs 206, 207, and 208 are vertically compressed and secured between the ascending-and-descending frame 132 and the motor base 134.

In the skew adjusting mechanism 201, the skew adjustment of the spindle motor 133 in the tangential direction can be carried out by adjusting the height of the skew adjustment screw 204 at one side, and the skew adjustment in the radial direction can be carried out by adjusting the heights of the two skew adjustment screws 203 and 205.

More specifically, when the heights of the three skew adjustment screws 201, 203, and 205 are adjusted, the compression repulsive forces of the three compression coil springs 206, 207, and 208 acting together make it possible to integrally adjust the tilting of the spindle motor 133 along with the motor base 134, with respect to the ascending-and-descending frame 132. This makes it possible to adjust with high precision the skew angle of the optical disk 1 with respect to the optical axis of the objective lens 137.

(5) Plate Spring Mechanism

A description of, for example, a plate spring mechanism 211 used as the skew mechanism 191 at the movable end 140b side of the guide sub-shaft 140 will be given with reference to FIGS. 16 to 22.

Figure 22A:
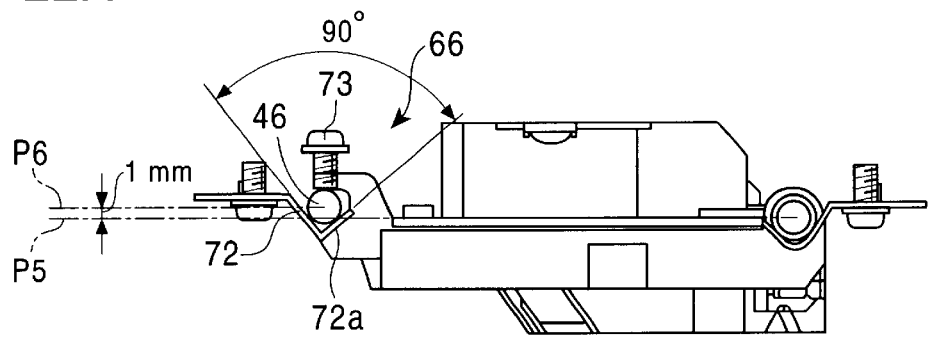
Figure 22A:
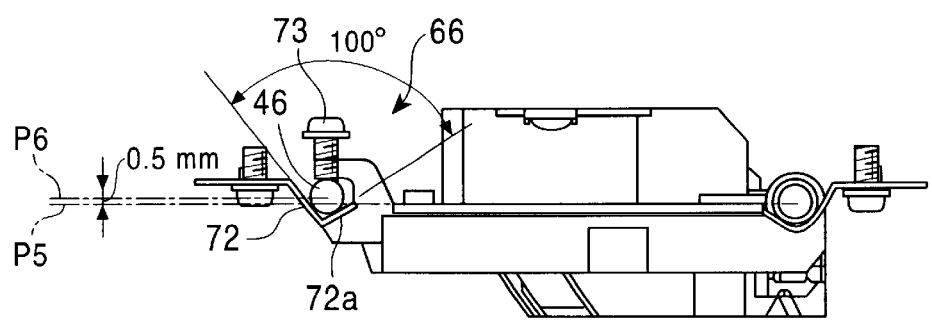
Figure 22C:
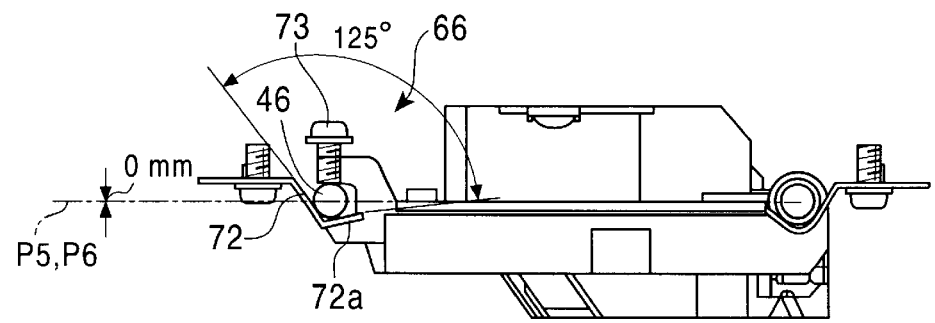

FIGS. 22A to 22C illustrate a simple skew adjusting mechanism 71. The guide main shaft 45, which guides the sled 43 at the optical pickup 41, is secured to the ascending-and-descending frame (not shown), and the angle of the guide sub-shaft 46 is vertically adjusted by a skew adjustment screw 73 and a plate spring 72 whose end 72a is bent into a substantially V shape, whereby a skew angle adjustment is carried out.

Here, for example, as shown in FIG. 22B, while a center position P6 of the guide sub-shaft 46 is separated upward by 0.5 mm from a center position P5 of the guide main shaft 45, the end 72a of the plate spring 72 has a V-shaped opening angle of, for example, 100°. Using this position as a reference, as shown in FIG. 22A, when the skew adjustment screw 73 is loosened by 0.5 mm in the upward direction, so that the center position P6 of the guide sub-shaft 46 is adjusted so as to be shifted upward to 1 mm from the center position P5 of the guide main shaft 45, the V-shaped opening angle of the end 72a of the plate spring 72 is reduced to, for example, 90°. On the contrary, as shown in FIG. 22C, when the skew adjustment screw 73 is screwed downward by 0.5 mm, so that the center position P6 of the guide main shaft 46 is adjusted so as to be shifted downward with respect to the center position P5 of the guide main shaft 45 to the 0-mm position, the V-shaped opening angle of the end 72a of the plate spring 72 widens to, for example 125°.

In this way, by only adjusting the movement of the guide sub-shaft 46 in the vertical direction by a very small stroke of 1 mm, the V-shaped opening angle of the end 72a of the plate spring 72 is resiliently deformed within a large range of angles of from 90° to 125°. When the vertical movable range of the end 72a of the plate spring 72 becomes equal to or greater than 1 mm, the end 72a of the plate spring 72 easily enters a plastic deformation occurring region. Therefore, it is believed that the end 72a of the plate spring 72 cannot be restored to its original shape. When the end 72a of the plate spring 72 cannot be restored to its proper original shape, the guide sub-shaft 46 can no longer be stably secured to the ascending-and-descending frame, making it possible for an erroneous skew angle or rattling of the guide main shaft 46 to occur. In addition, when the amount by which the guide sub-shaft 46 is pushed by the skew adjustment screw 73 becomes small due to the replacement of the optical pickup unit 38, such problems occur.

Figure 19:
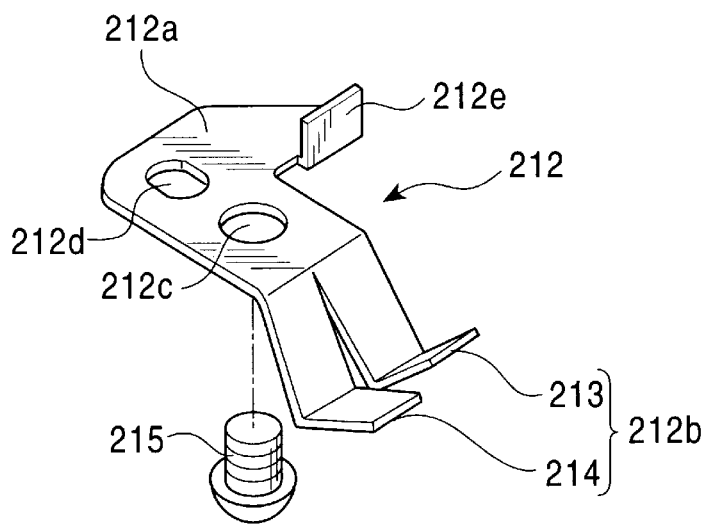
FIG. 19 is a perspective view of a plate spring used in the plate spring mechanism.

In the plate spring mechanism 211, a plate spring 212 shown in FIG. 19 is used. In the plate spring 212, a plurality of spring acting portions, such as two substantially V-shaped bent first and second spring acting portions 213 and 214, are integrally formed parallel to each other in a movable end 212b where bending areas are vertically shifted.

The fixed end 212a of the plate spring 212 is affixed to the bottom surface of the ascending-and-descending frame 132, which is a mounting member, from therebelow by a setscrew 193 inserted into a screw inserting hole 212c from therebelow. Then, a dowel hole 212d in the fixed end 212a is fitted onto a positioning dowel 197 at the bottom surface of the ascending-and-descending frame 132 from therebelow in order to secure the fixed end of the plate spring 212 to the fixed end 140b of the guide sub-shaft 140 serving as a presser member while it is perpendicular thereto. The two spring acting portions 213 and 214 of the movable end 212b of the plate spring 212 are disposed horizontally below the movable end 140b of the guide sub-shaft 140 in the axial direction of the guide sub-shaft 140.

At the movable end 140b of the guide sub-shaft 140, the first spring acting portion 213, whose flexing area is located at the upper side, is used to push the movable end 140b of the guide sub-shaft 140 against the bottom end surface of the skew adjustment screw 192 and the positioning reference portion 195 of the ascending-and-descending frame 132 from an obliquely downward direction.

Figure 17:
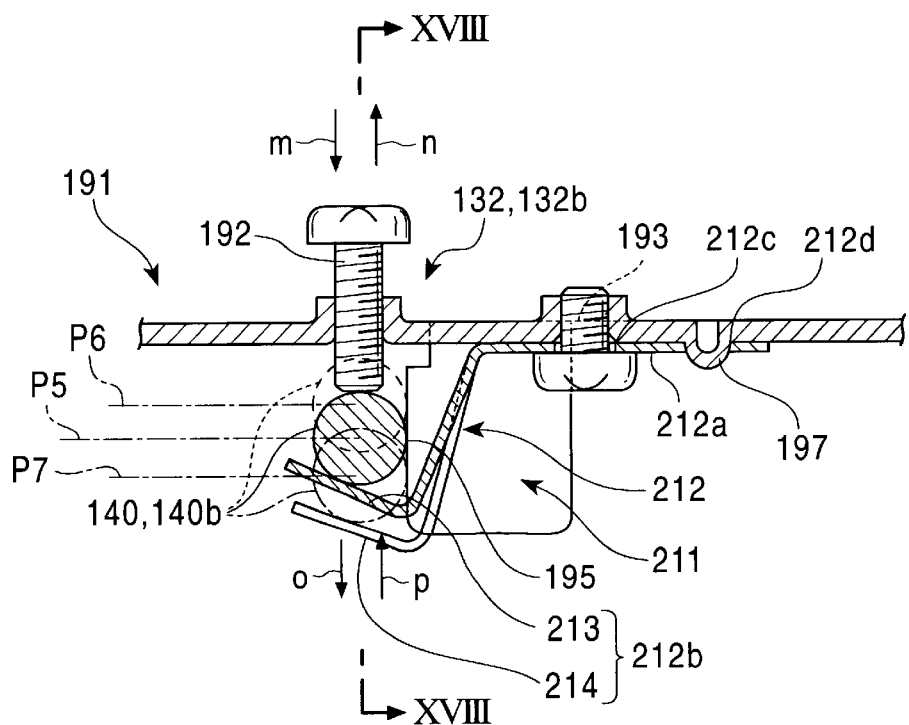
FIG. 17 is an enlarged sectional view of the plate spring mechanism.
Figure 18:
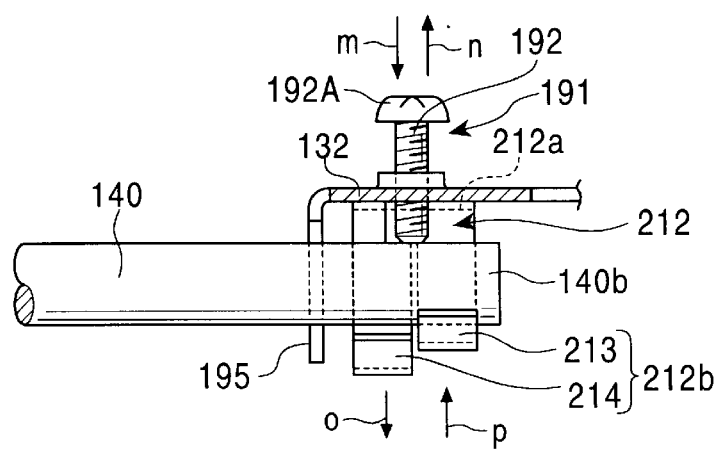
FIG. 18 is a sectional view taken along double-headed arrow XVIII—XVIII of FIG. 17.

In this way, in the case where there is used the plate spring 212 having integrally formed thereto the movable end 212b in which the flexing areas of the two spring acting portions 213 and 214 are formed at different locations in the vertical direction, when, as shown in FIGS. 17 and 18, the height of the skew adjustment screw 192 in the directions of arrows m and n that are upward and downward directions is adjusted in order to adjust the height of the movable end 140b of the guide sub-shaft 140 in the directions of arrows o and p that are upward and downward directions along the positioning reference portion 195 by a combined action with the spring force of the movable end 212b of the plate spring 212, it is possible, within a small range of movement towards a position P7 below the reference position P5 of the guide sub-shaft 140, to adjust the height of the guide sub-shaft 140 in the directions of arrows o and p by making use of only the spring force of the first spring acting portion 213 whose flexing area is formed at the upper side.

On the other hand, when the amount by which the skew adjustment screw 192 is pushed downward becomes large, so that the amount of downward movement of the guide sub-shaft 140 to the position P7 becomes large, causing the first spring acting portion 213 to enter a plastic deformation region, the function of pushing the guide sub-shaft 140 from two directions against the bottom end of the height adjustment screw 192 and the positioning reference portion 195 is taken over by the second spring acting portion 214 whose flexing area is previously formed at the lower side. In the area where plastic deformation of the second spring acting portion 214 itself does not occur, it is possible to continue properly and stably pushing the guide sub-shaft 140 at two locations by the bottom end surface of the skew adjustment screw 192 and the positioning reference portion 195.

In the case where, for example, the height adjustment range of the guide sub-shaft 140 becomes extremely large or the differences in diameters occur due to, for example, a change of the guide sub-shaft 140, even when plastic deformation of the first spring acting portion 214 of the plate spring 212 occurs, the second spring acting portion 213 functions, so that the height of the guide sub-shaft can be assuredly carried out.

Figure 16A:
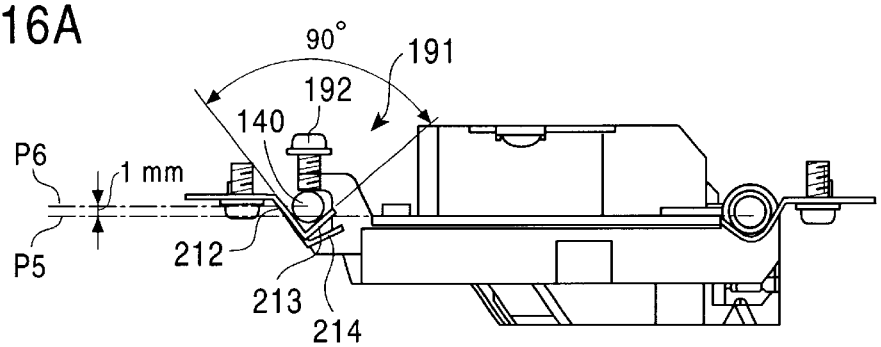
FIGS. 16A, 16B, and 16C are partly cutaway side views used to illustrate the operations of the skew adjusting mechanism and a plate spring mechanism applicable to the optical disk device in accordance with the present invention.
Figure 16B:
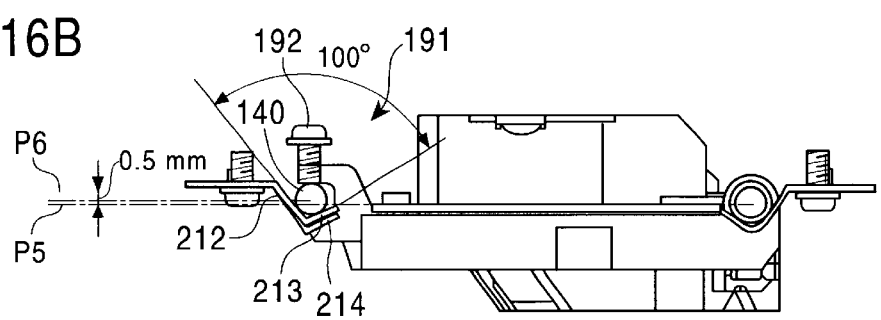
Figure 16C:
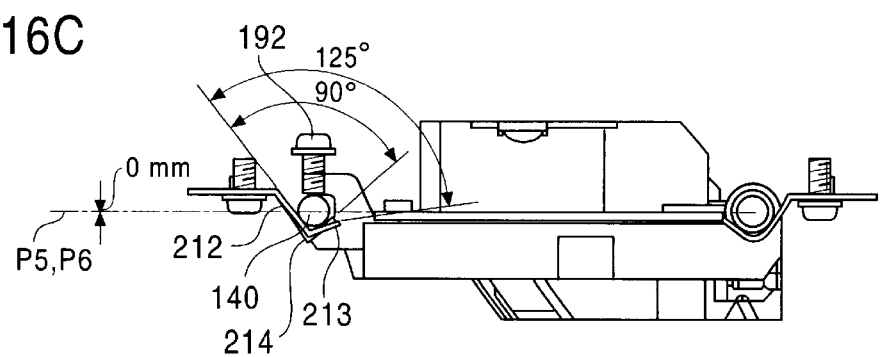

FIGS. 16A and 16B illustrate the case where within a small range of movement (such as within a range of 0.15 mm) of the guide sub-shaft 140 with respect to a prescribed location, the first spring acting portion 213 flexes with a safe V-shaped opening angle of 90° to 100° where plastic deformation of the first spring acting portion 213 does not occur. FIG. 16C illustrates the case where, when the range of movement of the guide sub-shaft 140 becomes large with respect to the prescribed location, the second spring acting portion 214 can push at a safe opening angle of 90° the guide sub-shaft 140 against the bottom end surface of the skew adjustment screw 192, in contrast to the first spring acting portion 213 being widened to a V-shaped opening angle causing plastic deformation.

Figure 20:
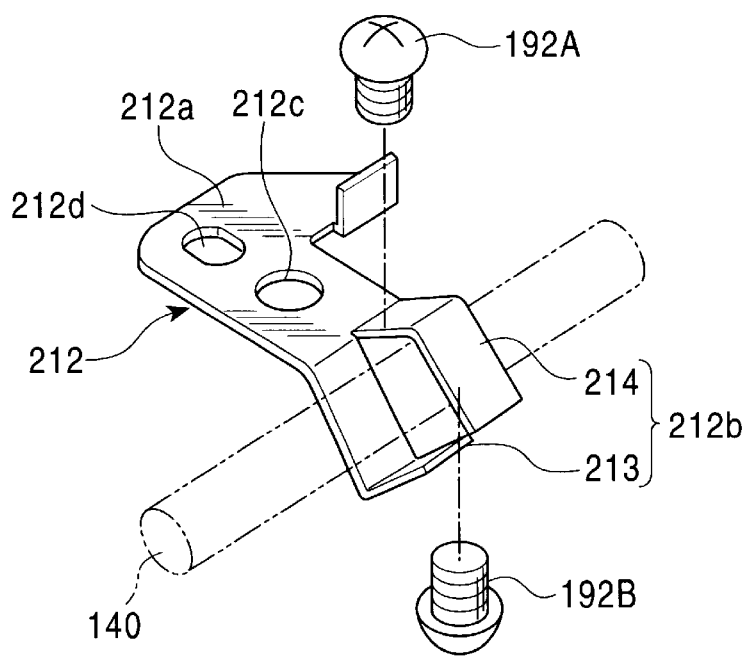
FIG. 20 is a perspective view of a modification of the plate spring mechanism.
Figure 21:
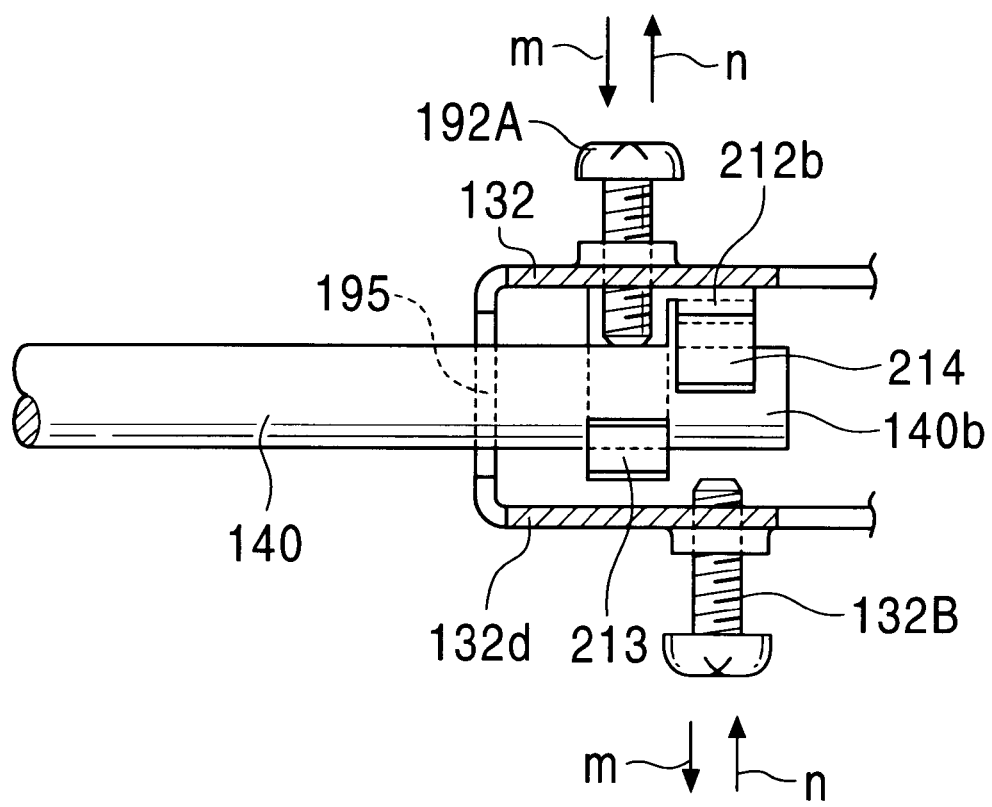
FIG. 21 is a partly cutaway side view of FIG. 20.

FIGS. 20 and 21 illustrates a modification of the plate spring 212. Substantially V-shaped first and second spring acting portions 213 and 214 are disposed symmetrically in the vertical direction. The guide sub-shaft 140 is inserted between the first and second spring acting portions 213 and 214, and the first spring acting portion 213 is used to push the guide sub-shaft 140 against a first skew adjustment screw 192A which is mounted facing downward to the ascending-and-descending frame 132 in the direction of arrow n from therebelow. Then, the second spring acting portion 214 is made to oppose the top portion of a second skew adjustment screw 192B upwardly inserted into and mounted to the screw mounting portion 132d that is provided by making a portion of the ascending-and-descending frame 132 extend below the guide sub-shaft 140 through the positioning reference portion 195.

In this case, in the case where the guide sub-shaft 140 is adjusted by moving it downward in the direction of arrow m against the first spring acting portion 213 by the first skew adjustment screw 192A, the second skew adjustment screw 192B is loosened in the direction of arrow m that is the downward direction. On the other hand, in the case where the guide sub-shaft 140 is adjusted by moving it upward in the direction of arrow n against the second spring acting portion 214 by the second skew adjustment screw 192B, the first skew adjustment screw 192A is loosened in the direction of arrow n that is the upward direction. When the guide sub-shaft 140 is adjusted by moving it downward, the first spring acting portion 213 is made to function, whereas, when the guide sub-shaft 140 is adjusted by moving it upward, the second spring acting portion 214 is made to function. Therefore, it is possible to increase the vertical movement adjustment range of the guide sub-shaft 140 without plastic deformation of the first and second spring acting portions 213 and 214.

Although an embodiment of the present invention has been described, the present invention is not limited thereto, so that various modifications can be made based on the technical concepts of the present invention.

The disk drive device of the present invention having the above-described structure can provide the following advantages.

The guide main shaft for guiding the pickup device of the disk-shaped recording medium is mounted to the pickup mounting frame first, and then the spindle motor is positioned with respect to the guide main shaft by a positioning means and is loaded to the pickup mounting frame. With the guide main shaft as a reference, it is possible to position the pickup device and the spindle motor with high precision, so that the interval between the pickup means and the guide main shaft, and the interval between the spindle motor and the guide main shaft can be constantly set with high precision, thereby making it possible to record data onto and/or reproduce data from a high-capacity disk-shaped recording medium.

In addition, since skew adjustments are carried out using the guide main shaft and the guide sub-shaft for positioning the pickup means and the spindle motor with high precision, both the setting of the pickup means and the spindle motor relative to each other with high precision, and the skew adjustments can be carried out with high precision.

Further, since, while the spindle motor is positioned with high precision by the guide main shaft, skew adjustments can be carried out by adjusting the angle of the spindle motor, it is possible to, in particular, in crease the precision with which the skew adjustments are carried out.

Still further, since the positioning means comprises two positioning pins, its structure is made simple, making it possible to reduce costs.

Still further, since the motor base of the spindle motor is mounted to the bottom portion of the pickup mounting frame through a spacer, and the spindle motor is inserted above the pickup mounting frame, the height of the disk table from the pickup mounting frame can be made small, the shaking of the core of the spindle motor can be prevented, and, even when a disk-shaped recording medium in which there is an imbalance in the center of gravity is used, a recording and/or a reproduction operation can be performed with high precision.

What is claimed is:

1. A disk drive device comprising a spindle motor affixed to a motor base for rotationally driving a disk-shaped recording medium, a pickup device having an optical axis for recording data onto and/or reproducing data from the disk-shaped recording medium that is rotationally driven by the spindle motor, a pickup moving mechanism having at least one guide shaft, the pickup moving mechanism guiding the pickup device along the guide shaft and moving the pickup device along a radial direction of the disk-shaped recording medium, a pickup mounting frame to which the guide shaft is mounted, a positioning means comprising at least two positioning pins that come into contact with at least two locations of a side surface of the guide shaft with at least two positioning pins affixed to the spindle motor base and being in contact with one end of the guide shaft so as to fix a position of the guide shaft, so that a distance between the optical axis and the guide shaft is equal to a distance between a rotational axis of the spindle motor and the guide shaft.

2. A disk drive device according to claim 1, further comprising a disk tray for loading the disk-shaped recording medium thereon, the disk tray being moved from a first position where the disk-shaped recording medium is taken out to a second position where data is recordable onto and/or data is reproducible from the disk-shaped recording medium.

3. A disk drive device according to claim 1, further comprising an ascending-and-descending actuation mechanism for raising and lowering the pickup mounting frame.

4. A disk drive device according to claim 3, wherein the ascending-and-descending actuation mechanism is actuated upward and downward, with an insulator mounted to the pickup mounting frame serving as a rotational fulcrum.

5. A disk drive device according to claim 1, further comprising a disk damper mechanism.

6. A disk drive device according to claim 1, wherein the pickup moving mechanism comprises a guide main shaft and a guide sub-shaft, and wherein one end of the guide main shaft is positioned by the positioning means.

7. A disk drive device according to claim 1, wherein the spindle motor has a disk table provided at a top end thereof, the disk table being provided for chucking the disk-shaped recording medium thereto, wherein the spindle motor is inserted upward into an insertion portion formed in the pickup mounting frame in order to dispose the disk table above the pickup mounting frame, and wherein the motor base, disposed at a bottom end of the spindle motor, is screwed to a bottom surface of the pickup mounting frame through a spacer.

8. A disk drive device according to claim 1, wherein the spindle motor has a dis table provided at a top end thereof, the disk table being provided for chucking the disk-shaped recording medium thereto, wherein the spindle motor is inserted upward into an insertion portion formed in the pickup mounting frame in order to dispose the disk table above the pickup mounting frame, and wherein the motor base, disposed at a bottom end of the spindle motor, is screwed to a bottom surface of the pickup mounting frame thorugh a spacer.

9. A disk drive device according to claim 8, wherein the skew adjusting mechanism performs an adjusting operation while rotationally driving the disk-shaped recording medium.

10. A disk drive device according to claim 8, wherein the skew adjusting mechanism performs an adjusting operation while detecting light reflected from the disk-shaped recording medium.

11. A disk drive device according to claim 8, wherein the skew adjusting mechanism performs a skew angle adjusting operation in a vertical direction using a skew adjustment screw and a plate spring, the plate spring having two integrally formed parallel spring portions, a first spring portion and a second spring portion, which are bent into substantially V shapes.

12. A disk drive device according to claim 11, wherein the first and second spring acting portions which are bent into substantially V shapes are disposed in the vertical direction.

13. A disk drive device according to claim 8, wherein the spindle motor has a disk table provided at a top end thereof, the disk table being provided for chucking the disk-shaped recording medium thereto, wherein the spindle motor is inserted upward into an insertion portion formed in the pickup mounting frame in order to dispose the disk table above the pickup mounting frame, and wherein the motor base, disposed at a bottom end of the spindle motor, is screwed to a bottom surface of the pickup mounting frame through a spacer.

14. A disk drive device according to claim 9, wherein the positioning means comprises at least two positioning pins that come into contact with at least two locations of a side surface of the guide shaft, with the at least two positioning pins being mounted to the motor base of the spindle motor.

15. A disk drive device according to claim 14, wherein the spindle motor has a disk table provided at a top end thereof, the disk table being provided for chucking the disk-shaped recording medium thereto, wherein the spindle motor is inserted upward into an insertion portion formed in the pickup mounting frame in order to dispose the disk table above the pickup mounting frame, and wherein the motor base, disposed at a bottom end of the spindle motor, is screwed to a bottom surface of the pickup mounting frame through a spacer.

16. A disk drive device according to claim 15, wherein the skew adjusting mechanism comprises a compression coil spring disposed at an outer periphery of the spacer, the skew adjusting mechanism performing a spindle motor angle adjusting operation as a result of compressing the compressing coil spring between the pickup mounting frame and the motor base.

17. A disk drive device according to claim 16, wherein the spacer is disposed at a first position and a second position in a direction perpendicular to the guide shaft and situated on both sides of a motor shaft and on both sides of the disk table, and wherein the spacer is disposed at a third position in a direction parallel to the guide shaft and substantially linear to either one of the first position and the second position.

* * * * *